US012176637B2

(12) United States Patent
Gieski et al.

(10) Patent No.: US 12,176,637 B2
(45) Date of Patent: Dec. 24, 2024

(54) ELECTRICAL CONNECTOR FOR HIGH POWER COMPUTING SYSTEM

(71) Applicant: FCI USA LLC, Etters, PA (US)

(72) Inventors: Christopher S. Gieski, Dillsburg, PA (US); Clarence Randall Fry, Mount Holly Springs, PA (US); Steven E. Pressel, Harrisburg, PA (US)

(73) Assignee: FCI USA LLC, Etters, PA (US)

( * ) Notice: Subject to any disclaimer, the term of this patent is extended or adjusted under 35 U.S.C. 154(b) by 276 days.

(21) Appl. No.: 17/666,498

(22) Filed: Feb. 7, 2022

(65) Prior Publication Data

US 2022/0255250 A1 Aug. 11, 2022

Related U.S. Application Data

(60) Provisional application No. 63/147,721, filed on Feb. 9, 2021.

(51) Int. Cl.
*H01R 12/58* (2011.01)
*H01R 12/70* (2011.01)
(Continued)

(52) U.S. Cl.
CPC ....... *H01R 12/585* (2013.01); *H01R 12/7064* (2013.01); *H01R 13/502* (2013.01); *H01R 13/665* (2013.01)

(58) Field of Classification Search
None
See application file for complete search history.

(56) References Cited

U.S. PATENT DOCUMENTS 5,030,108 A 7/1991 Babow et al.
5,221,218 A 6/1993 Marach
(Continued)

FOREIGN PATENT DOCUMENTS

CN 2490737 Y 5/2002
CN 101082825 A 12/2007
(Continued)

OTHER PUBLICATIONS

International Search Report and Written Opinion mailed Sep. 16, 2020 in connection with International Application No. PCT/CN2019/124770.

(Continued)

*Primary Examiner* — Oscar C Jimenez
(74) *Attorney, Agent, or Firm* — Wolf, Greenfield & Sacks, P.C.

(57) ABSTRACT

A connector that enables electronic assemblies to be efficiently configured for any of multiple power requirements. The connector may have a mating interface, which may mate with a power supply, a mounting interface for attaching the connector to a PCB and a power tap off interface. The power tap off interface may enable distribution of a portion of the power received through the mating interface to remote locations on the PCB. The connector may be assembled with conductive element subassemblies, enabling efficient configuration of the connector with conductive elements with and without mating contact portion for power tap off. Each subassembly may include a member to which other members with mating contact portions and/or tails for a mounting interface are attached. A projection providing mechanical support for the power tap off interface may be angled relative to the mating interface such that the connector provides lower resistance to airflow, which may lower the
(Continued)

cost and/or enable enhanced performance of an assembly using such a connector.

20 Claims, 23 Drawing Sheets

(51) Int. Cl.
*H01R 13/502* (2006.01)
*H01R 13/66* (2006.01)

(56) References Cited

U.S. PATENT DOCUMENTS

| | | | |
|---|---|---|---|
| 5,797,757 | A | 8/1998 | Aoki |
| 6,024,589 | A | 2/2000 | Hahn, IV et al. |
| 6,036,508 | A | 3/2000 | Anderson et al. |
| 6,540,558 | B1 * | 4/2003 | Paagman ........... H01R 13/6587 439/607.11 |
| 6,780,018 | B1 | 8/2004 | Shipe |
| 6,780,027 | B2 | 8/2004 | Allison |
| 6,848,948 | B1 | 2/2005 | Khemakhem et al. |
| 6,848,950 | B2 | 2/2005 | Allison et al. |
| 6,994,598 | B2 | 2/2006 | Holmes et al. |
| 7,976,317 | B2 | 7/2011 | Patel et al. |
| 8,057,266 | B1 | 11/2011 | Roitberg |
| 8,435,047 | B2 | 5/2013 | Patel et al. |
| 8,573,983 | B2 * | 11/2013 | Zieder .................... H01R 11/09 439/8 |
| 8,610,316 | B2 | 12/2013 | Spitaels et al. |
| 9,559,446 | B1 | 1/2017 | Wetzel et al. |
| 10,096,920 | B2 | 10/2018 | Lee |
| 10,784,631 | B2 | 9/2020 | Brungard et al. |
| 11,539,154 | B2 | 12/2022 | Horning et al. |
| 2006/0223385 | A1 | 10/2006 | Pavlovic et al. |
| 2007/0293084 | A1 | 12/2007 | Ngo |
| 2009/0246990 | A1 | 10/2009 | Yang et al. |
| 2012/0190219 | A1 | 7/2012 | Pai et al. |
| 2016/0093963 | A1 * | 3/2016 | Streckewald .......... H01R 12/91 439/733.1 |
| 2016/0338191 | A1 | 11/2016 | Tanaka et al. |
| 2019/0288450 | A1 | 9/2019 | Brungard |
| 2019/0288466 | A1 | 9/2019 | Copper et al. |
| 2022/0329014 | A1 * | 10/2022 | Zi .......................... H01R 12/75 |
| 2023/0006379 | A1 | 1/2023 | Gieski et al. |
| 2023/0163528 | A1 | 5/2023 | Gieski |

FOREIGN PATENT DOCUMENTS

| | | | |
|---|---|---|---|
| CN | 202384604 | U | 8/2012 |
| CN | 207853027 | U | 9/2018 |
| CN | 109787004 | A | 5/2019 |
| DE | 102016218018 | A1 | 3/2018 |
| EP | 3477776 | A1 | 5/2019 |
| GB | 2342789 | A | 4/2000 |
| TW | M449366 | U | 3/2013 |
| WO | 2015/112773 | A1 | 7/2015 |

OTHER PUBLICATIONS

International Search Report and Written Opinion mailed May 20, 2022 in connection with International Application No. PCT/US2022/015609.

Gieski et al., Card-Edge Connector System With Busbar Connection For High-Power Applications, U.S. Appl. No. 17/784,076, filed Jun. 9, 2022.

* cited by examiner

ELECTRICAL CONNECTOR FOR HIGH POWER COMPUTING SYSTEM

CROSS-REFERENCE TO RELATED APPLICATIONS

This application claims priority to and the benefit under 35 U.S.C. § 119 (e) of U.S. Provisional Patent Application Ser. No. 63/147,721, filed on Feb. 9, 2021, entitled "ELECTRICAL CONNECTOR FOR HIGH POWER COMPUTING SYSTEM," which is hereby incorporated herein by reference in its entirety.

FIELD OF THE DISCLOSURE

The technology disclosed herein relates to electrical interconnection systems, for example, electrical interconnection systems for supplying electrical power in a computing system that draws a high current.

BACKGROUND

Electrical connectors are used in many electrical systems. Electronic devices have been provided with assorted types of connectors whose primary purpose is to enable data, commands, power and/or other signals to pass between electronic assemblies. It is generally easier and more cost effective to manufacture an electrical system as separate electronic assemblies that may be joined with electrical connectors. The electrical connectors may transfer power between electronic assemblies via one or more electrical contacts, which may make up a part of the electrical connector. For example, one type of electronic assembly is a printed circuit board ("PCB"). The terms "card" and "PCB" may be used interchangeably herein.

In some scenarios, a two-piece connector is used to join two assemblies. One connector may be mounted to each of the assemblies. The connectors may be mated, forming connections between the two assemblies.

In other scenarios, a PCB may be joined directly to another electronic assembly via a one-piece connector, which may be configured as a card edge connector. The PCB may have pads along an edge that is designed to be inserted into an electrical connector attached to another assembly. Contacts within the electrical connector may contact the pads, thus connecting the PCB to the other assembly through the connector.

In some scenarios, busbars may be routed through an electronic device to distribute power to electronic assemblies within the device. The electronic assemblies may be connected to the busbar through connectors or screws.

SUMMARY

In some embodiments, an electrical mating interface includes a first member having a first mating contact portion, a second member, wherein the second member is separate from and electrically coupled to the first member, and a third member having a second mating contact portion separate from and electrically coupled to the second member, wherein the second member is shaped such that the first mating member is angularly offset relative to the second mating member.

In another aspect, an electrical connector may comprise a mating interface, a power tap off interface and a mounting interface. The electrical connector may comprise a plurality of first members, each of the first members comprising a mating interface portion at the mating interface; a plurality of second members; and a plurality of third members, each of the third members comprising a mating interface portion at the power tap off interface. The plurality of first members and the plurality of third members may be electrically connected through the plurality of second members.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

BRIEF DESCRIPTION OF DRAWINGS

Various aspects and embodiments of the present technology disclosed herein are described below with reference to the accompanying figures. It should be appreciated that the figures are not necessarily drawn to scale. Items appearing in multiple figures may be indicated by the same reference numeral. For the purposes of clarity, not every component may be labeled in every figure.

DETAILED DESCRIPTION

Figure 1:
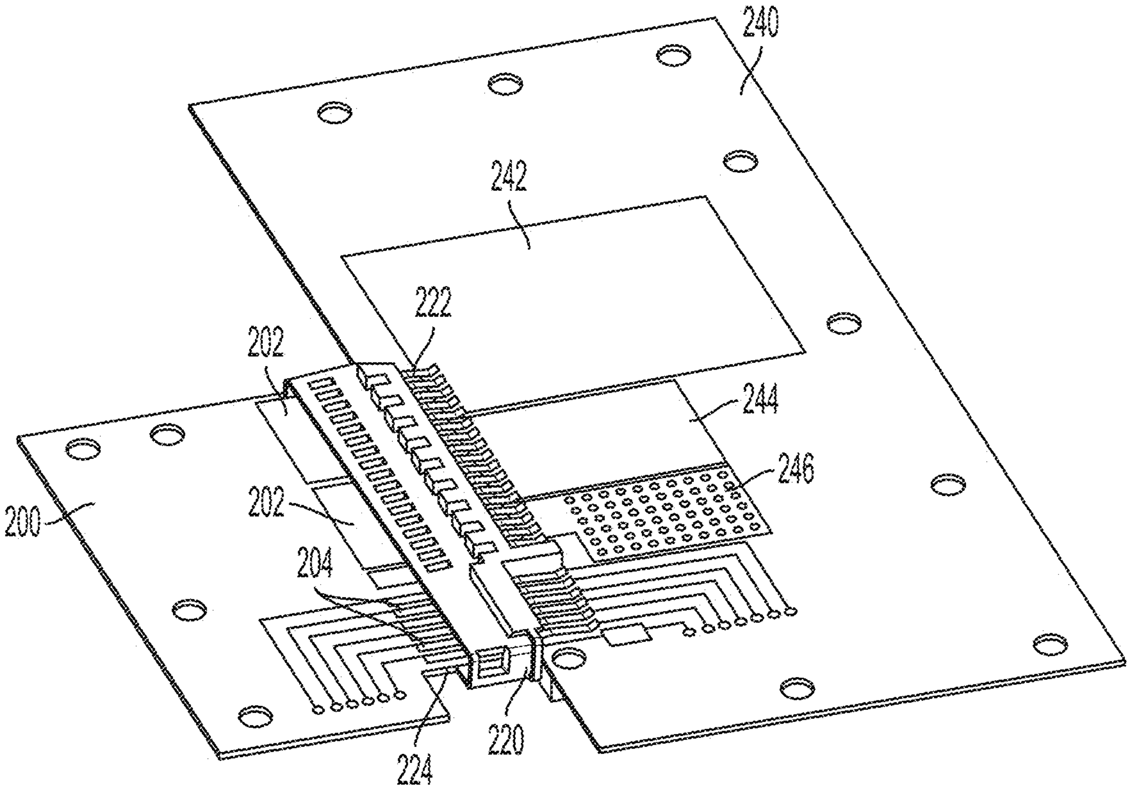
FIG. 1 is a simplified perspective view of two parallel boards connected through a straddle-mount card edge connector, according to one illustrative embodiment.

The Inventors have recognized and appreciated architectures for high speed, high performance electronic assemblies with low life-cycle costs. The assemblies may be implemented with a substrate (e.g., a printed circuit board (PCB)) to which is mounted a first connector with power tap off. The connector with power tap off may have at least two mating interfaces. One mating interface may be configured to connect to a power supply. The other mating interface may be configured to receive a conductive interconnect, such as a busbar or a cable, that can distribute power. Without the conductive interconnect in place, current supplied through the first mating interface of the first connector may be distributed to components of the electronic assembly through the substrate (e.g., through the power planes of a PCB).

With the conductive interconnect in place, a portion of the supplied current may flow through the interconnect to components of the electronic assembly remote from the first connector without flowing through the substrate in the vicinity of the connector. In this way, the current density within the substrate in the vicinity of the first connector is decreased relative to a configuration in which the interconnect is not installed. Alternatively or additionally, the total current supplied to the electronic assembly may be increased without increasing the current density within the substrate in the vicinity of the first connector.

An increase in current may be desired, for example, during the life of an electronic assembly when it is upgraded with additional or more powerful components, which draw more power. These components may be added in the field or may be included in newly manufactured devices using a substrate designed prior to the upgrade. The capability to add the interconnect and increase the total current without increasing current density enables the substrate to be designed with a capability to carry less than the total amount of power that every copy of such a substrate might ever have to carry over its lifetime. Because increasing the current carrying capacity of a substrate, such as a PCB, conventionally entails adding more layers to the PCB, enabling a PCB to be designed for less than the total current it might carry, a PCB may be designed to be thinner and to have a lower manufacturing cost than a conventional PCB of the same capabilities.

Further, the Inventors have recognized and appreciated approaches for economically manufacturing conductive elements with mating contacts suitable for use in connectors with multiple mating interfaces. Such conductive elements may be configurable with elements that may provide mating contacts and/or tails for mounting to a substrate. For example, a conductive element may be configured to mate with a power supply at a first mating interface of the connector. That same conductive element may alternatively or additionally be configured to mate with an interconnect, such as a busbar or cable, at a second mating interface. Further, the conductive element can optionally be configured for mounting to a substrate. Such conductive elements, regardless of configuration, may carry large currents, without excessive heating.

In some embodiments, the conductive element may have a body that may have a thickness suitable for carrying a high current. The body may have holes into which may be inserted press fit segments of one or more mating contact members. The body may be shaped such that mating contact members extending from a first set of holes in the body are positioned for mating at the first mating interface of the connector. Mating contact members extending from a second set of holes in the body are positioned for mating at the second mating interface of the connector. Members inserted into holes in the body may be positioned to form a mounting interface for the connector. In some embodiments, the members forming the mounting interface may be integrally formed with one or more of the mating contact members.

In some embodiments, a connector with a power tap off that supports selective addition of a conductive interconnect may have a mounting interface and two mating interfaces. The mating interfaces may face in directions that are angularly offset from one another, such as between 45 and 180 degrees. The mating interfaces and the mounting interface may be interconnected within the connector housing such that power supplied through one mating interface may be distributed to components of an electronic assembly mounted on a substrate, such as a PCB, either through the mounting interface and then through the power planes of the PCB or through the second mating interface to a conductive interconnect and then to a second connector where the current may be coupled to the components attached to the PCB through the PCB.

In some embodiments, one of the mating interfaces of the connector may be a card edge connector, which may be configured to receive a card edge, or similarly sized structure, from a power supply. In other embodiments, a mating interface of the connector may be configured for mating with a mating connector, which might, in turn, have a mounting interface for connection to a printed circuit board or other substrate.

A mating interface for power tap off may similarly be configured like a card edge connector, but may receive a busbar or similarly sized terminal of a power cable. In other embodiments, the power tap off mating interface may have terminals that mate with terminals in a connector terminating a power cable assembly.

Turning to the figures, specific non-limiting embodiments are described in further detail. It should be understood that the various systems, components, features, and methods described relative to these embodiments may be used either individually and/or in any desired combination as the disclosure is not limited to only the specific embodiments described herein.

FIG. 1 shows a Printed Circuit Board ("PCB") 200 connected to PCB 240 via a connector, which in this example is a card-edge connector 220. PCBs mechanically support and electrically connect one or more electronic components using conductive traces, pads, and other features etched from one or more conductive layers laminated onto layers of a non-conductive material. Traditionally, conductive layers are made from copper and non-conductive layers are made from woven fiberglass and flame-resistant epoxy resin binders. PCBs are generally made with interspersed conductive layers of conductive traces that carry signals and layers that are largely continuous sheets. The largely continuous layers serve as grounds for the signal traces and can also carry power. They are sometimes called power planes.

In the embodiment of FIG. 1, PCB 200 is illustrative of a portion of a power supply unit (PSU) configured for insertion into a card-edge connector via a parallel board (straddle-mount) arrangement. Other arrangements, such as vertically oriented or right-angle oriented connections are also possible. PCB 200 contains two conductive pads 202 configured to supply power and six conductive pads 204 configured to supply signal, although it should be understood that any number of each could be used in alternate embodiments.

The power pads 202 of PSU 200 may be on an edge suitable for a contact surface, which may be inserted into a slot 224 of a card-edge connector 220 containing power terminals 222. In some embodiments, the conductive pads 202 may comprise a high-conductivity material able to conduct electric current sufficient for applications requiring at least 3000 W of power and having sufficient robustness to withstand repeated mating and unmating with a connector. For example, conductive pads 202 may be surface portions with cladding, such as a layer of Cu that has a thickness of at least 0.14 mm, or at least 0.5 mm, or at least 1 mm, or at least 1.5 mm, in some embodiments. The power supply may deliver relatively large currents, such as up to 60 A, 80 A, 100 A, 120 A, 180 A, 200 A or greater.

As illustrated in the example of FIG. 1, the power pads 202 may be wider than the signal pads 204. Such a design enables the power pads 202 to carry more current than the signal pads 204, without excessive heating. The larger cross-sectional area of the power pads 202 provide a lower contact resistance, a lower bulk resistance, and a lower current density, all of which contribute to less heating within the connector when a relatively large amount of current passes through the power pads 202.

Power terminals 222 in the card-edge connector may similarly be designed to pass larger amounts of power with an acceptable amount of heating. Current flow is often used as an indication of delivered power, because power and current are related, and heating is proportional to current flow. Acceptable heating may be expressed as temperature rise at a rated current. As a specific example, a connector, or a power terminal within the connector, may have a rated current capacity that reflects the amount of current that will increase the temperature from ambient conditions by a set amount, such as 30° C. For example, the heating in the connector may be below this threshold amount when a high current, such as 60 A, 80 A, 100 A, 120 A, 180 A, 200 A or greater in some embodiments is transmitted.

Card-edge connector 220 passes electrical signals and/or power between PCB 200 and PCB 240. To do so, card-edge connector 220 contains a slot 224 which receives PSU PCB 200. This slot can be uniform, if the card to be inserted has a consistent thickness along its insertion edge, or non-uniform if this thickness varies. Once inserted, power terminals 202 and signal terminals 204 come into contact with one or more conductive elements 222 that pass electrical signals and/or power to PCB 240. These elements may be formed of conductive materials and may be sufficiently robust to allow for the repeated mating and unmating with a mating component, such as a card edge like that on PCB 200 or conductive elements of a mating connector. PCB 204 contains components (not shown) that use, condition, or otherwise interact with the electronic signals and/or power transmitted across card-edge connector 220. Power may be distributed to these components through power pads 242, 244, 246, to which the conductive elements of connector 220 are electrically and mechanically connected. The components may be connected directly to the pads. Alternatively, the pads and the components may be connected together through conductive layers within the PCB, which are sometimes referred to as power planes.

In some embodiments, the various functions of these components may require different and incompatible electronic signals and/or power. For example, some components may require 5V whereas other components may require 12V. As such, the designs of PCB 200, card-edge connector 220, and PCB 240 are constructed to provide discrete electric pathways as required for different voltage levels.

The Inventors have recognized that in the card-edge connector embodiment shown in FIG. 1, the full amount of current that is transmitted to PCB 240 across card-edge connector 220 is distributed to the power planes of PCB 240, creating a high current density in the PCB 240 adjacent connector 220. As such, the amount of current that can be transmitted is limited by both the thickness of each power plane and the number of power planes in the region of PCB 240 adjacent connector 220. Making thicker power planes may undesirably increase the size cost and/or manufacturing complexity of the PCB. Adding additional power planes may increase the amount of power that can be transmitted via PCB 240. More power planes add cost, weight, and thickness to the PCB and to an electronic assembly incorporating it. The number of power planes required to supply large currents (e.g., 60-100 Amps, 180-260 Amps, etc.) may therefore be undesirable. In scenarios in which a PCB is designed for possible upgrades that will draw high currents, initial construction with enough power planes to support future high currents may similarly be undesirable.

In some embodiments described herein, a PCB may be designed with fewer power planes than are necessary to carry a designed maximum current. One or more connectors may be mounted to the PCB. When more power than can be carried by the power planes is desired, such a connector may be connected to a conductive interconnect, such as a busbar or cable assembly, that may distribute power to locations on the PCB remote from the one or more connectors. The conductive interconnect may extend in a direction parallel to the PCB.

The one or more connectors may have multiple interfaces, including a first mating interface, which may be configured as a mating interface of a conventional card edge connector. Current may be supplied to the connector through the first mating interface and then distributed through other interfaces of the connector to the PCB directly or to the conductive interconnect, which may pass over the PCB. Splitting the current within the connector reduces the current density in the PCB adjacent the connector.

Figure 2:
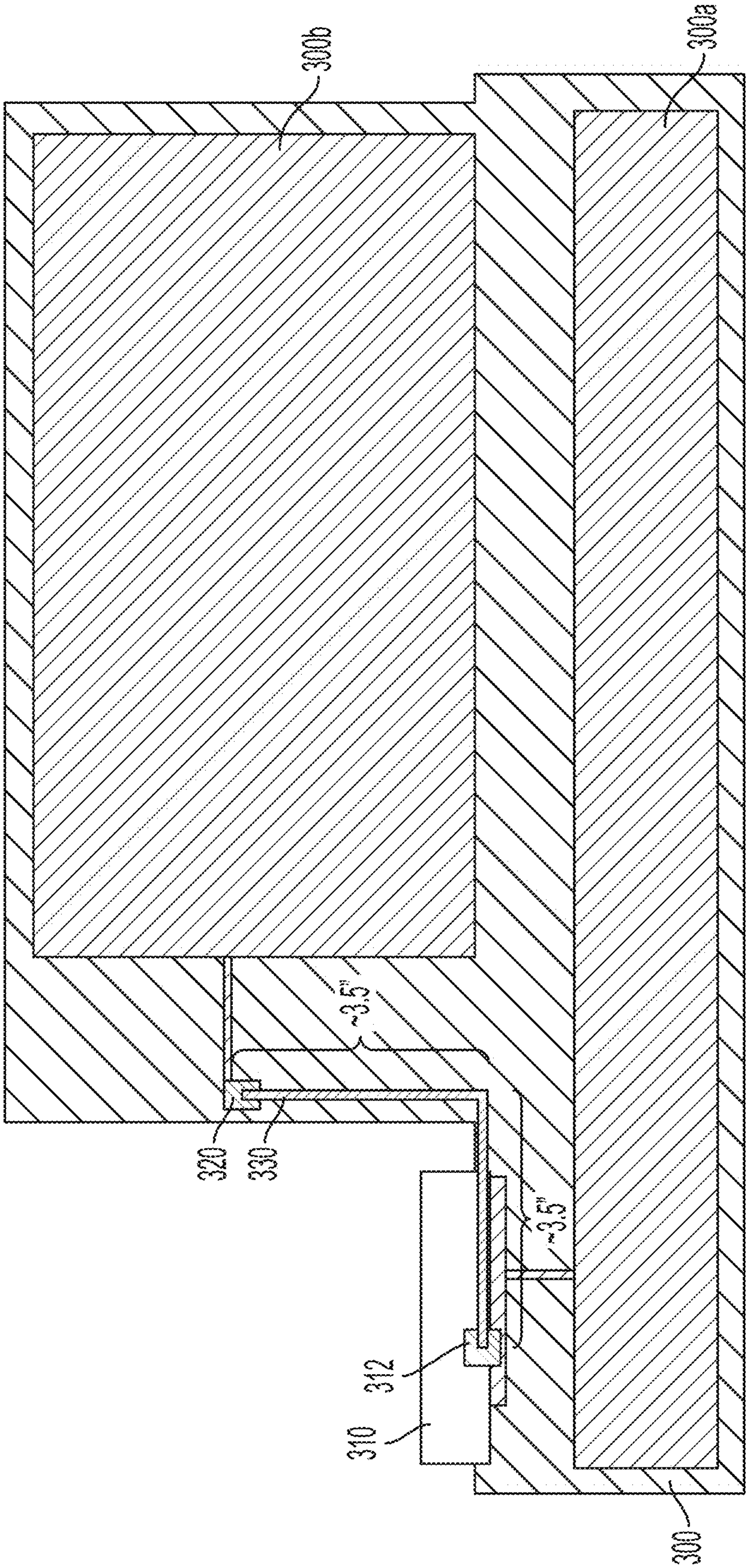
FIG. 2 is a schematic view illustrating distribution of power supplied through a card-edge connector in part through a conductive interconnect, such as a busbar, and in part through power planes in a PCB, according to one illustrative embodiment.

FIG. 2 is a schematic illustration of a PCB 300 with such a card-edge connector 310. In this example, connector 310 may be configured to mate with a PSU (not illustrated in FIG. 3). Card-edge connector 310 contains an additional mating interface 312 which is configured to receive a conductive interconnect, which in this example is a busbar 330. Mating interface 312 enables power to be tapped off from within connector 310 and delivered through the conductive interconnect to a remote location on the PCB 300.

Busbar 330 may be implemented as a metallic strip, such as a metal bar. The busbar may be insulated or uninsulated and may have sufficient thickness to be unsupported or, in some embodiments the busbar may be supported in air by insulated pillars. These features enable the busbar to be air cooled. In some embodiments, the bus bar is bent at a right angle, forming two legs, with each of its two legs between 2" and 24" long, and in some embodiments between 3" to 10", such as 3.5" in some embodiments. A busbar may be configured to carry power at a single voltage or may be configured to carry power of multiple voltage levels. In embodiments in which the busbar is configured to carry power at multiple voltage levels, the busbar may contain multiple, electrically insulated metal strips.

A first end of busbar 330 may be inserted into mating interface 312. Mating interface 312 may be configured as a card-edge connector with a slot of sufficient width to receive the busbar 330. A second end of busbar 330 may be coupled to the power planes of PCB 300 at a location remote from connector 310. In the illustrated example, busbar 330 is inserted into a second connector 320 to provide coupling to PCB 300. Connector 320 may similarly have a mating interface configured to receive the busbar 330. As power is supplied via card-edge connector 310, a first portion of the power may pass through the mounting interface of connector 310 to PCB 300 in the vicinity of connector 310. A second portion of the power may be tapped off and transmitted to PCB 300 via busbar 330 and connector 320. Once coupled to the PCB, the power may be distributed to components attached to the PCB through power planes in the PCB.

In the example of FIG. 2, the first portion of the power is delivered to section 300*a* of PCB 300 and the second portion of the power is delivered to section 300*b* of PCB 300. In the schematic shown in FIG. 2, section 300*a* and section 300*b* are on the same PCB but are not electronically connected. However, it is not necessary that the sections 300*a* and 300*b* be electrically decoupled. In some embodiments, PCB 300 may be implemented as a conventional PCB with power planes that extend substantially continuously throughout the PCB. Even in such a configuration, current flow may split based on the power draw of components and electrical properties of PCB 300. Thus, even if the sections are not physically separate, the power flow throughout each of the sections 300*a* and 300*b* is less than the total supplied power, resulting in lower maximum power density in the PCB than without busbar 330.

While this embodiment shows a single busbar 330 and traces from each connector 310 and 320 to respective sections of the PCB, it should be appreciated that FIG. 2 is a schematic illustration of current splitting. FIG. 2 is provided to schematically illustrate lower maximum current density, with lower maximum heat generation per unit area of the PCB, that enables the assembly formed with PCB 300 to operate at a higher power level than without busbar 330.

Figure 3A:
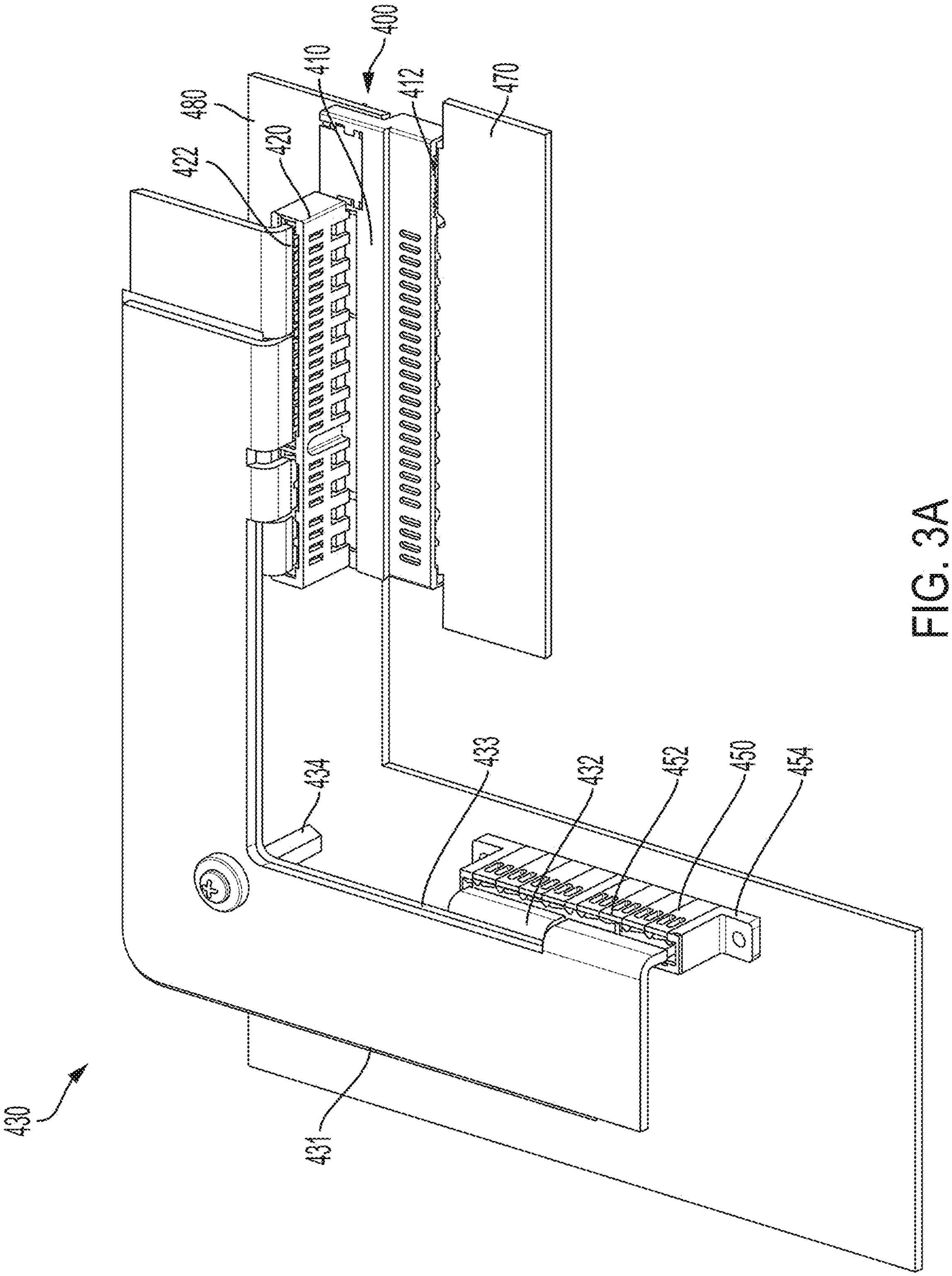
FIG. 3A is a perspective view of an exemplary embodiment of a portion of an electronic device with card-edge connector mounted to a PCB with busbars connected to distribute power to components on the PCB.
Figure 3B:
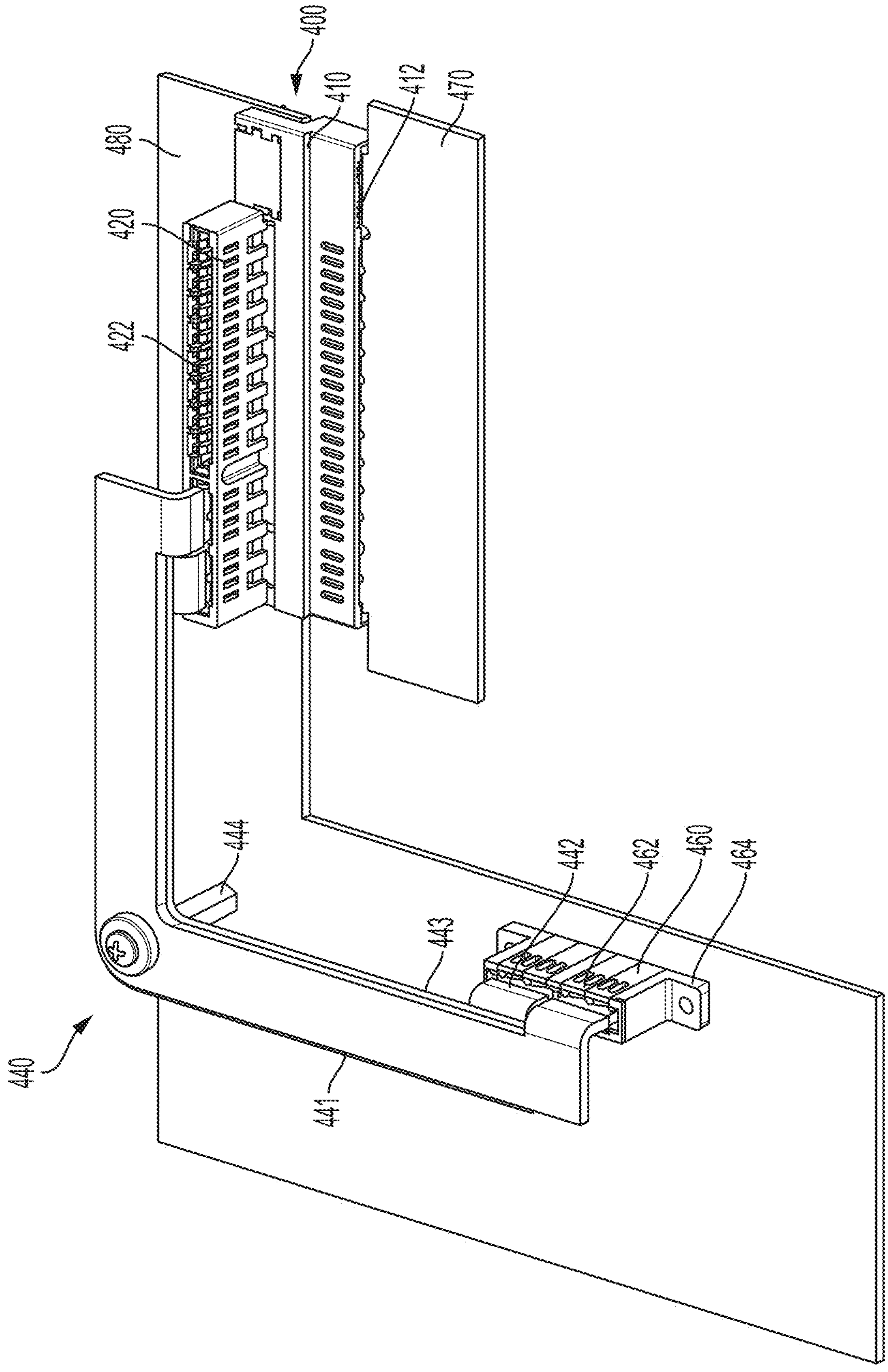
FIG. 3B is a perspective view of a portion of an alternate embodiment of an electronic device with card-edge connector mounted to a PCB with busbars connected to distribute power to components on the PCB.

FIGS. 3A-B show two possible configurations of the busbar connector schematically shown in FIG. 2. In both figures, the PCB and card-edge connection arrangement remains the same, although in alternate embodiments they may be different. In both figures, a source of power, here illustrated as PSU 470, is inserted into slot 412, forming a first horizontal mating interface 410 of L-shaped card-edge connector 400. Electrical signals and a first portion of the supplied current is coupled to PCB 480 through L-shaped card-edge connector 400, which may have a board mounting interface as in a conventional connector.

In addition, a portion of the supplied current may pass through a second vertical mating interface 420 of connector 400. In this example, vertical mating interface 420 includes a second slot 422 into which a busbar 430, in the case of FIG. 3A, or busbar 440, in the case of FIG. 3B, is inserted. A second portion of the supplied current may be carried to connector 450, which includes a third mating interface 452 and second mounting interface 454, via busbar 430 in FIG. 3A or connector 460, which includes a third mating interface 462 and second mounting interface 464, via busbar 440 in FIG. 4B. From the remote connector, the second portion of the current may pass into PCB 480 adjacent connector 450 or 460, enabling that second portion to be distributed to components mounted to PCB 480, without increasing the current density adjacent connector 400.

In the illustrated embodiment, busbars 430 and 440 are configured with two electrically separate paths. To support this function, busbar 430 contains a first portion 431 and a second portion 432 in FIG. 3A, and busbar 440 contains a first portion 441 and a second portion 442 in FIG. 3B. In both figures, these portions may be separated by sheets of insulation, 433 in FIG. 3A and 443 in FIG. 3B. These first and second portions may be configured to transmit electric power of different characteristics, such as different polarities to provide a supply and a return, different voltages, or different frequencies. In other embodiments, the portions of the busbar may be electrically coupled and may transmit electric power of identical characteristics with higher current carrying capacity than one portion alone.

In some embodiments, an insulative support, an example of which is post 434 in FIG. 3A and 444 in FIG. 3B, may provide additional structural support to busbars 430 and 440.

In this example, the posts hold busbars 430 and 440 parallel to PCB 480. In this example, busbars 430 and 440 bend at an approximately 90-degree angle, and the posts provide support at the bends.

Busbar 440 in FIG. 3B is configured with different dimensions than busbar 430 in FIG. 3A. Busbar 440 has a reduced cross-sectional area relative to busbar 430. Busbar 440 may be used, for example, in applications with lower power requirements than those of busbar 430. For example, busbar 430 could be configured to carry a maximum current between 180-260 Amps, such as 220 Amps, whereas busbar 440 could be configured to carry a maximum current between 60-100 Amps, such as 80 Amps. The reduced cross section of busbar 440 also means that it contacts fewer of the terminals within the second mating interface 420 of connector 400.

System configurations as shown in FIGS. 3A and 3B may result from using a PCB 480 to which a connector 400 is attached. Connector 400 has a mating interface that may mate with a PSU or other component through which current may be supplied. Connector 400 also includes a mounting interface in which terminals inside the connector are connected to PCB 480, coupling current received through the mating interface into the power planes within PCB 480. In some embodiments, there may be a sufficient number of power planes in PCB 480 for current to pass through the mounting interface of connector 400 without exceeding the current rating at any portion of PCB 480.

In such a configuration, no conductive interconnect may be inserted into the second mating interface 420 of connector 400. In such a configuration, a second connector, such as connectors 450 and 460 may be present, but not connected to connector 400 through a conductive interconnect separate from PCB 480. Alternatively or additionally, the second connector may be omitted.

Nonetheless, PCB 480 may be manufactured with a footprint for a second connector, which may be used to mount a second connector when the power draw of all the components mounted on PCB 480 will cause the current density in the vicinity of connector 400 to exceed the current carrying capacity of the power planes within PCB 480. In that scenario, a second connector, such as connector 450 or 460, may be mounted in the footprint and connected to connector 400 through a conductive interconnect capable of carrying a portion of the supplied current from connector 400 to the second connector without passing through PCB 480.

The configuration of the second connector, and of the conductive interconnect joining the first and second connectors, may depend on the amount by which the current required for operation of the components on PCB 480 exceeds the current carrying capacity of the power planes in the vicinity of connector 400. The second connector may be sized to receive a wider busbar, for example, when the required current exceeds the current capacity by a larger amount. As specific examples, PCB 480 may be designed with 18 or fewer layers but may nonetheless carry up to 60 Amps. If the required current is between 60 and 100 Amps, a busbar as shown in FIG. 3B may be added to carry an additional 40 Amps. If a current between 100 and 200 Amps is required, a busbar as shown in FIG. 4A may be added to carry up to an addition 140 Amps, for example.

In this example, a connector mounted to PCB 480 may be configured based on the amount of current to be diverted from the first connector to the second connector. Alternatively or additionally, the conductive interconnect between connectors may be configured based on the amount of current to be diverted. As illustrated in FIG. 3B in connection with the second mating interface on connector 400, a bus bar may be inserted into only a portion of a slot that forms the mating interface. Using this technique, a larger connector suitable for diverting a relatively large amount of current, such as connector 450, may be mounted to PCB 480. If a system is configured such that less than the full amount of this large current needs to be diverted, a smaller busbar may be used and a portion of the mating interface of the larger connector 450 may be unoccupied.

Figure 4:
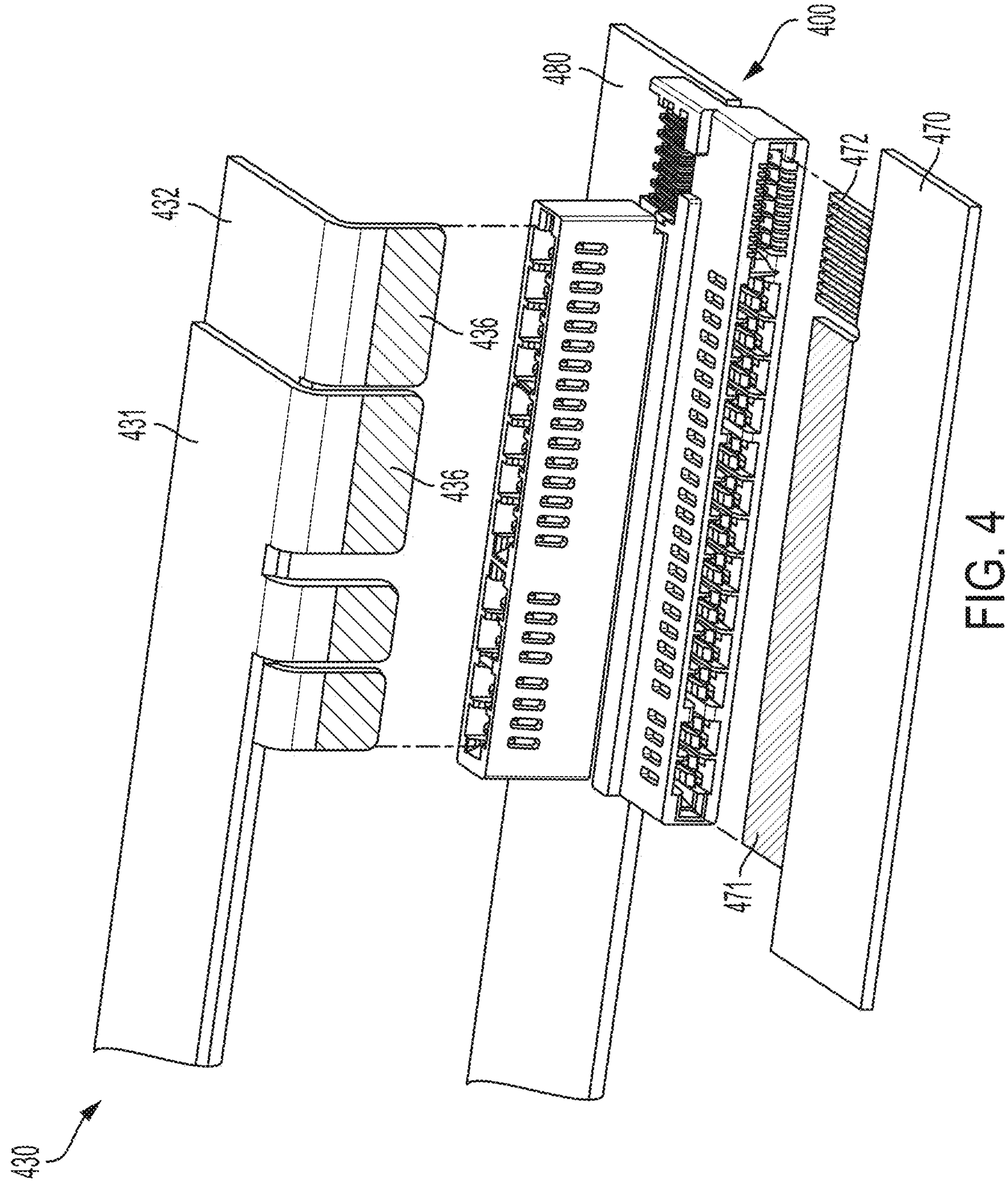
FIG. 4 is a perspective, partially exploded view of a portion the electronic device of FIG. 4A, including a connector mounted to a PCB and mated to a card edge of a power supply unit and a busbar, according to one illustrative embodiment.

FIG. 4 shows the connector from FIG. 3A with busbar and PSU disconnected. A plurality of conductive elements (e.g. 800, FIGS. 7A-7B) within L-shaped card edge connector 400 are configured to electrically connect portions of at least three surfaces. In the embodiment shown in FIG. 4, those surfaces are non-coplanar and are on the following components:

The power terminals 436 of busbars 431 and 432;

The power terminals 471 and signal terminals 472 of PSU 470; and

PCB 480.

Figure 5:
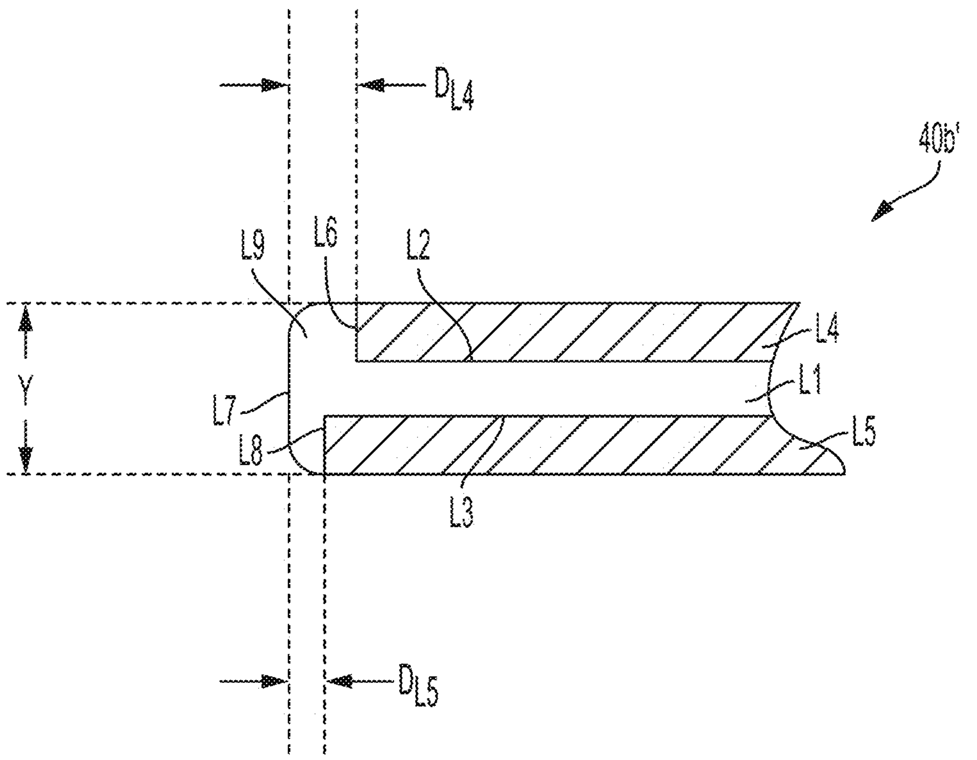
FIG. 5 is a cross sectional view of a busbar, according to one illustrative embodiment.

In the embodiment of FIG. 4, busbar 430 includes two electrically separate portions, 431 and 432, stacked one above the other. Each of the portions may have terminal portions forming power terminals 436. FIG. 5 shows an exemplary cross section of an embodiment of a busbar. In this embodiment, the busbar is a laminated assembly **40*b*' comprised of an insulative layer L1 having first and second surfaces L2, L3, a first blade L4 arranged on the first surface L2, and a second blade L5 arranged on the second surface L3. The first and second surfaces L2 and L3 may be parallel to the segment of busbar vertically inserted into a slot forming a mating interface on L-shaped card-edge connector 40. The first blade L4 may have a first insertion edge L6 that is set back from an insertion edge L7 of the laminated assembly 40*b*' by a first distance DL4, and the second blade L5 may haves a second insertion edge L8 that is set back from the insertion edge L7 of the laminated assembly 40*b*' by a second distance DL5 that may be different from the first distance DL4. The first distance DL4 may be in a range of 1 mm to 8 mm. The second distance DL5 may be in a range of 1 mm to 6 mm. As a specific example, the difference in set-back may be on the order of 2 mm to 5 mm. Such a configuration may be used, for example, in a busbar in which one of the blades L4 and L5 is connected to a supply line of a circuit of the power supply and the other of the blades L4 and L5 is connected to a return line for that circuit. Such a configuration enables advance mating of the supply or return line when the laminated assembly 40*b*' is inserted into a slot of a connector, by using the second blade L5** for that portion of the circuit to mate first.

The insulative layer L1 may comprise a rigid plastic layer, which may include an endcap L9 that extends over the first and second insertion edges L6, L8 of the first and second blades L4, L5. Alternatively, the insulative layer L1 may comprise an insulative film. For example, the insulative film may have a thickness of about 0.1 mm and the conductive blades L4, L5 may be copper sheets having a thickness of about 1 mm.

Assembly **40*b*', in this embodiment, may extend from a recessed portion of an insulative housing of the power busbar. The first conductive blade L4 may be a current-in blade that may provide 3000 Watts of power at 48 V, and the second conductive blade L5** may be a current-out blade.

The laminated assembly 40*b*' may have a total thickness Y in a range of 1 mm to 6.5 mm. A thickness of each of the first and second conductive blades L4, L5 may be in a range of 0.5 mm to 3.5 mm.

While shown in this embodiment as a laminated assembly 40*b*', it should be understood that the busbar could be a laminate comprised of additional layers or a single solid member. Further, though FIG. 5 is described as representing a busbar that connects a first connector and a second connector, a structure as shown in FIG. 5 may be a portion of a power supply and may be inserted into a first mating interface of connector 400.

Figure 6B:
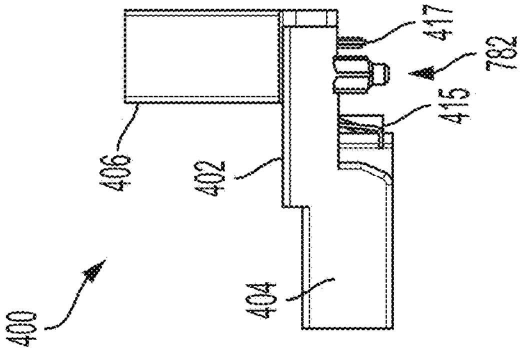
FIGS. 6A and 6B are a front view of the card-receiving face and right-side view, respectively, of an exemplary embodiment of a card-edge connector configured for bus bar input.
Figure 6A:
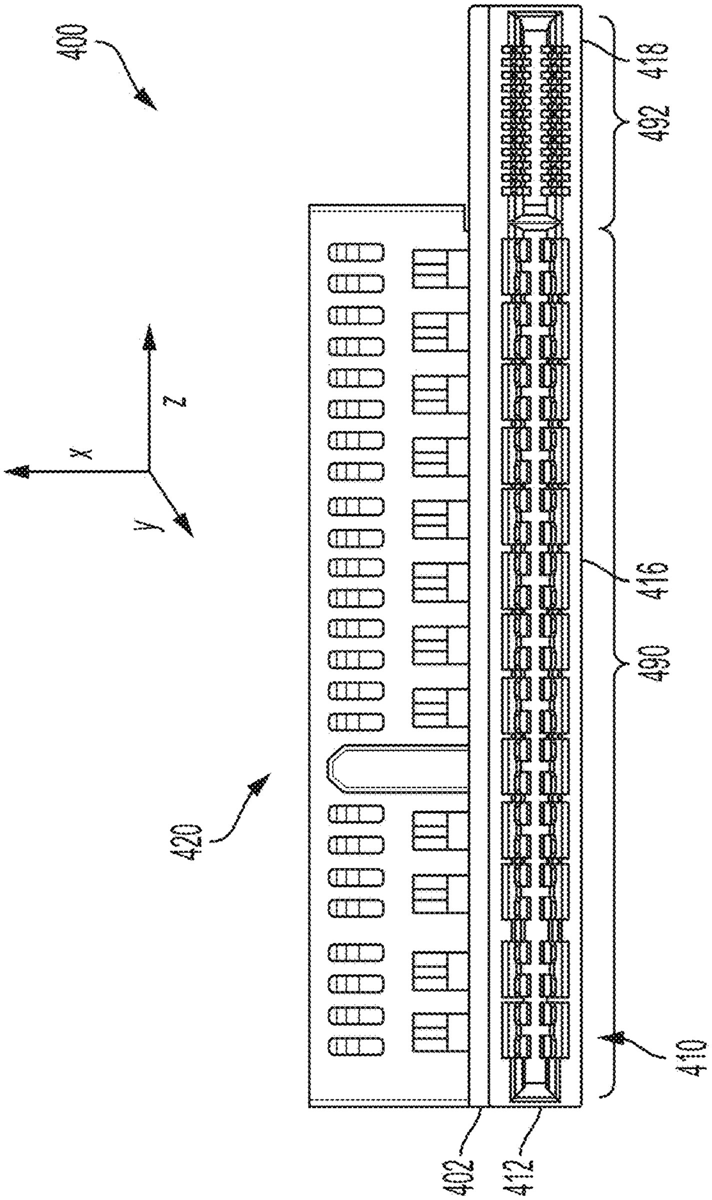

FIGS. 6A and 6B show front and side views, respectively, of L-shaped card-edge connector 400. Connector 400 has an L-shaped housing 402. Housing 402 could be formed of a rigid, insulative material capable of withstanding the high heat generated by the transfer of high voltage electricity. Housing 402, for example, may be molded from high temperature plastic with fiberglass fillers.

L-shaped housing 402 provides a first mating interface 410 and a second mating interface 420 and a mounting interface 782. In the example of FIGS. 6A and 6B, housing 402 has a horizontal section 404, which will be parallel to a surface of a printed circuit board to which connector 400 is attached. The first mating interface 410 is formed in the horizontal section. Housing 402 also has a vertical section 406. The second mating interface 420 is formed in the vertical section.

In the embodiment illustrated, mounting interface 782 is formed at the intersection of the horizontal and vertical sections. The illustrated configuration supports parallel board connections between a PCB to which connector 400 is attached and a board inserted into the first mating interface 410, such as is illustrated in FIGS. 3A and 3B. However, other relative positions of the mating and mounting interfaces are possible to support other system configurations.

In some embodiments, the horizontal and vertical sections could be of the same length. In other embodiments, such as the embodiment shown in FIGS. 6A and 6B, these sections could be of different length. In the illustrated embodiment, the first mating interface 410 has a power portion 490 and a signal portion 492. In this example, the second mating interface supports only power connections and is approximately the same length as the power portion 490 of the mating interface. In some configurations, however, only a portion of the power supplied through the first mating interface is delivered to components of the PCB to which connector 400 is attached and the second mating interface may be shorter than even the power portion 490 of the first mating interface 410.

Both mating interfaces 410 and 420 are configured, in this embodiment, as card edge connectors. The housing 402 comprises a first slot 412, forming a portion of the first mating interface 410 and a second slot 422 (FIG. 4) forming a portion of the second mating interface 420. In this embodiment shown, slots 412 and 422 are offset by an angle of 90 degrees, resulting in an L-shape, but it should be understood that other angular offsets are possible to support different system configurations. In this embodiment, the housing 402 is configured to receive a PCB configured for edge connection (e.g., a PSU) in the first slot 412 and a conductive interconnect, such as a busbar, in the second slot 422.

Located within housing 402 are two pluralities of conductive elements. The first plurality of conductive elements 416 transmit electric power and the second plurality of conductive elements 418 transmit electric signals. In the embodiment illustrated, the power conductive elements are configured to make power connections between the first mating interface 410, second mating interface 420 and mounting interface 782. The signal conductive elements 418 may be shaped as in a conventional connector or otherwise to provide connections. Tails 415 and 417 of conductive elements 416 and 418 are exposed at mounting interface 782 where they can be attached to a printed circuit board. In the example of FIG. 6B, the tails protrude from the underside of card-edge connector 400. The tails are configured to electrically connect a card-edge connector 400 to a PCB for the purposes of transmitting electrical power and signals. The tails may be shaped for attachment to a PCB via soldering, press fitting, or any other attachment technique. In some embodiments, different tail configurations may be used for signal and power connections. Power connections, for example, may be made through post in hole soldering and signal connections may be made through surface mount soldering or may be press fit.

Figure 7B:
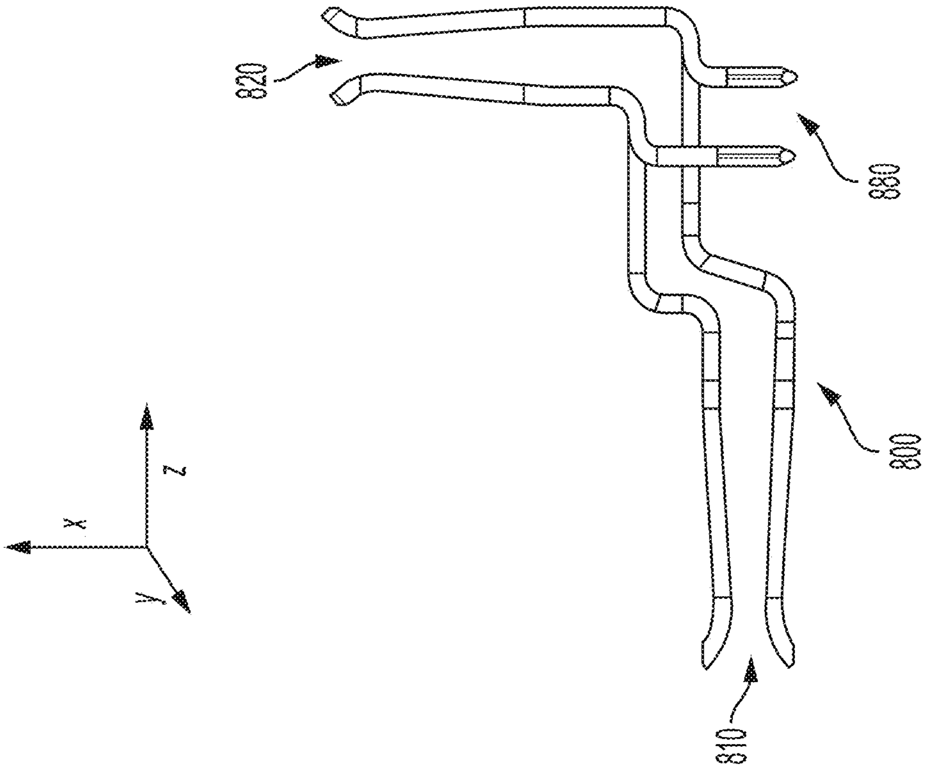
FIGS. 7A and 7B are a perspective and a right-side view, respectively, of an exemplary embodiment of conductive elements within a card-edge connector.
Figure 7A:
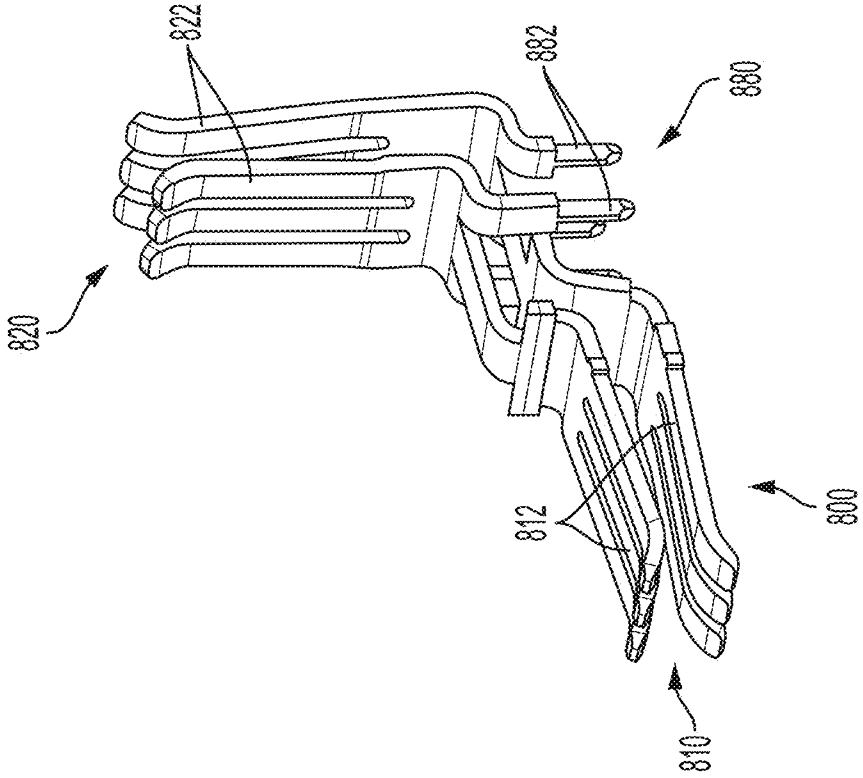

FIGS. 7A and 7B show a perspective and side view of an embodiment of the power conductive elements 415 that may be located within L-shaped card-edge connector 400. In some embodiments, the set of power conductive elements 415 may be configured to carry a large amount of current, for example a maximum current between 60 Amps and 260 Amps. Each of the power conductive elements 800 and may be formed of one or more members that collectively provide multiple interfaces. Those members, for example, may each be stamped from a sheet of metal and then formed to provide mating and mounting interfaces. In this example, each of the power conductive elements has a first mating member 810 and a second mating member 820 positioned to form a portion of each of two mating interfaces, 410 and 420, and tails 880, positioned to form a mounting interface 782.

In the illustrated embodiment, the mating members are formed as contact surfaces on spring fingers. Each of the power conductive elements 800 may have a first set of spaced-apart fingers 812 extending horizontally and a second set of spaced-apart fingers 822 extending vertically. Each of the power conductive elements 800 may have a set of tails 882 descending vertically. As such, the first and second sets of fingers, 812 and 822, may be offset from each other by 90 degrees and the second and set of fingers and tails, 822 and 882, may be offset from each other by 180 degrees.

In the illustrated embodiment, each of the mating interfaces is shown with three spring fingers of similar dimensions. In other embodiments, the number of spring fingers for some or all of the mating interfaces may be more or less than three. Moreover, in some embodiments, different mating interfaces may have different numbers of spring fingers. Moreover, some or all of the spring fingers may have different dimensions than others. Alternatively or additionally, some or all of the mating and/or mounting interfaces may be shaped differently than as illustrated.

Figure 8A:
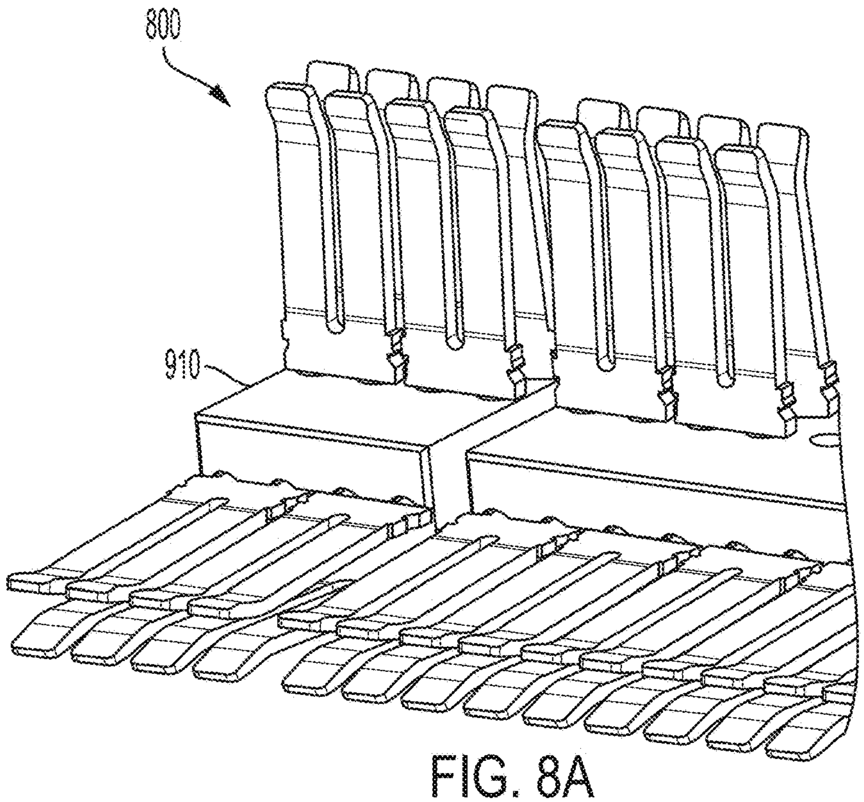
FIGS. 8A and 8B are a perspective and right-side view, respectively, of an exemplary embodiment of conductive elements within a card-edge connector.
Figure 8B:
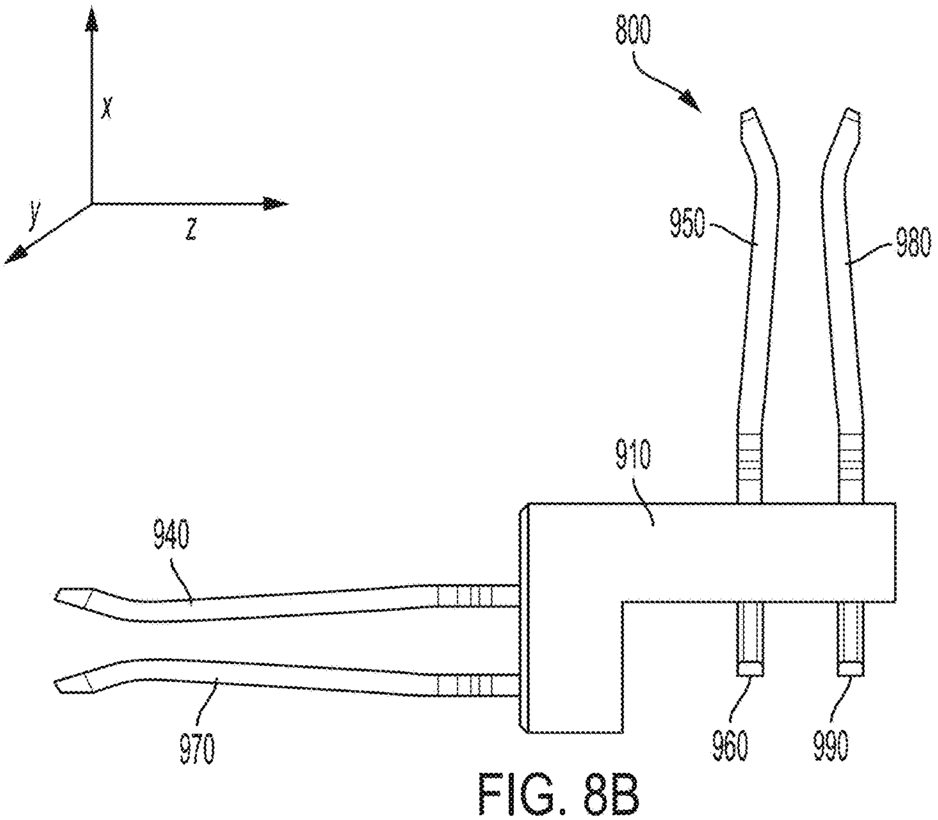

In the illustrated embodiment, power conductive elements are held together in subassemblies that are inserted into the connector housing. The power conductive elements may be held together, for example, by subassembly housings 910 in FIGS. 8A and 8B, which may be plastic molded around intermediated portions of the conductive elements 800, leaving the mating and mounting portions of the conductive elements exposed. Some or all of the power conductive elements may be held in the same housing and there may be one or more subassemblies in a connector. The subassemblies may be inserted into a housing, such as housing 402, to form a connector.

In some embodiments, the power conductive elements may be positioned in pairs. Fingers on one conductive element of a pair may have contact surfaces facing the contact surfaces of the other conductive element of the pair. In the embodiment illustrated in FIGS. 8A and 8B, both conductive elements of the pairs are held in the same housing 910, which establishes a desired spacing between the mating contact surfaces of the conductive element of the pair.

The conductive elements may be positioned such that the contact surfaces of the pairs line opposite sides of a slot that forms a mating interface to receive either an edge of a PCB or a conductive interconnect, such as a busbar or cable connector. For example, spring fingers 940 and 970 are spring fingers on respective power conductive elements of a pair that have opposing contact surfaces. Likewise, spring fingers 950 and 980 have opposing contact surfaces. In both instances, the spring fingers may bend towards each other such that a spring force is generated against a component, such as a PCB or bus bar, inserted in the slot between them.

In this example, spring finger 940 and 950 may be integrally formed from a sheet of metal from which a power conductive element was stamped. Similarly, spring fingers 970 and 980 may be integrally formed from a sheet of metal from which a power conductive element was stamped. Each such sheet of metal may be stamped with multiple fingers. Additionally, each such sheet may be stamped with tails, such as tails 960 and 990. Tails 960, for example, may be stamped of the same sheet as spring fingers 940 and 950 and tails 990 may be stamped from the same sheet as spring fingers 970 and 980. As such, in some embodiments, spring fingers and tail, 940, 950, and 960 may be electrically connected. Likewise, in some embodiments, spring fingers and tail 970, 980, and 990 may be electrically connected.

Figure 9A:
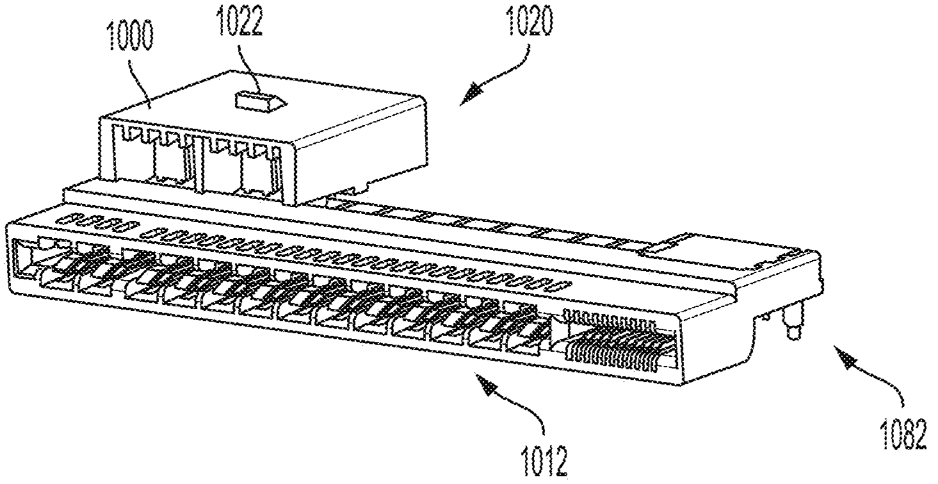
FIGS. 9A, 9B and 9C are a perspective, front and right-side view, respectively, of an alternative embodiment of a connector.
Figure 9B:
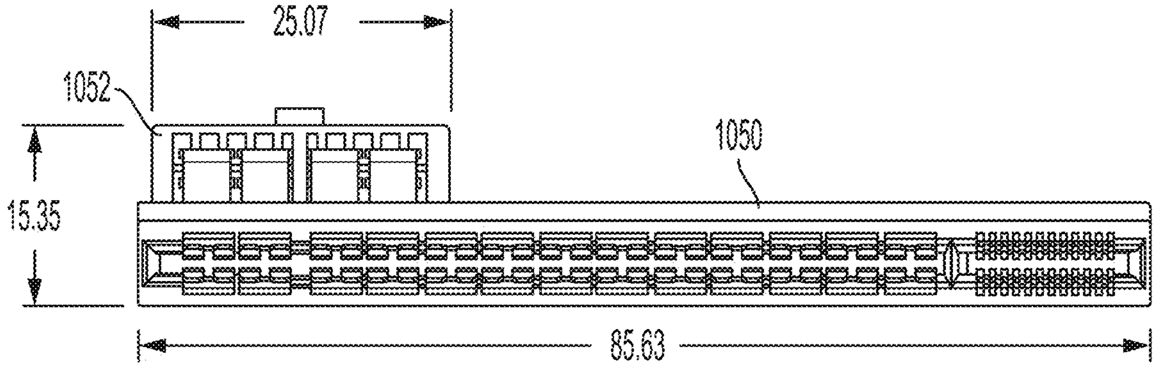
Figure 9C:
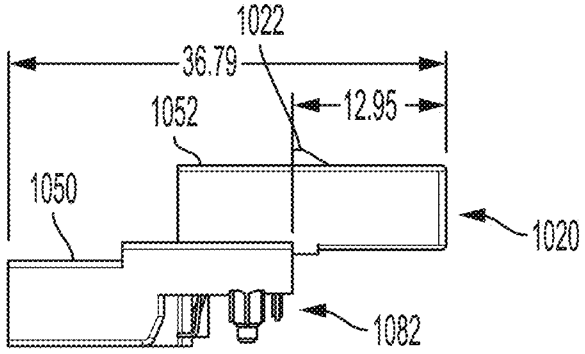

FIGS. 9A, 9B and 9C illustrate an exemplary embodiment of a connector configured for use in a system in which a first portion of the power supplied through a connector may be delivered to a PCB through a mounting interface of the connector and a second portion may be delivered to a remote location on the PCB through a conductive interconnect. The connector 1000 is here shown with a first mating interface 1012 and a mounting interface 1082, which may be configured as with the first mating interfaces and mounting interfaces as described above. First mating interface 1012 may be formed, for example, by a slot in housing portion 1050 lined with spring fingers of conductive elements. Mounting interface 1082 may be formed with tails of those conductive elements extending from housing portion 1050.

A second mating interface 1020 may also be provided for mating with a conductive interconnect that distributes a portion of the power supplied through first mating interface 1012 to a remote location of the PCB to which connector 1000 is mounted. Second mating interface 1020 may be formed, as described above in connection with second mating interface 420, with a slot in a housing portion 1052. The slot may be lined with one or more rows of members of conductive elements. Those conductive elements may be integral with the members of the conductive elements forming first mating interface 1012.

In contrast to second mating interface 420 in which the slot has a vertical orientation, the slot of second mating interface has a horizontal orientation. Accordingly, a conductive interconnect, such as a busbar or cable assembly, is inserted into the second mating interface 1020 in a horizontal direction. The conductive elements are formed to position members to line this horizontal slot.

Further, the housing connector 1000 is shaped to provide two slots with this orientation. In the illustrated embodiment, housing portions 1050 and 1052 are both elongated in a horizontal direction. The housing portions are illustrated elongated in offset planes, but embodiments with other vertical separation between the elongated portions, and therefore the first and second mating interface, may be constructed.

Dimensions (in millimeters) are noted in FIGS. 9B and 9C. Those dimensions are illustrative rather than limiting. Other embodiments may have any one or more dimensions differing from the stated dimensions by 10%, 20%, 50%, for example. These dimensions illustrate that the housing portion 1052 providing a power tap off need not occupy the full width of the connector. It might, for example, occupy a length that is between 10 and 30% of the mating interface, for example.

Further, it is not a requirement that the conductive interconnect be a busbar. In some embodiments, one or more cables may form a conductive interconnect. The number of cables may depend on the number of high current circuits in the electronic device. Each cable may be terminated with a mating portion, which may be a separate element, such as a tab terminal, or may be formed by fusing strands of the conductors of the cable into a tab. Such a configuration may be used in connection with a card edge connector or other connector with conductive elements having mating contact portions configured to mate with a flat surface. Mating portions that have spring fingers or other compliant structures may be used in some embodiments. In some embodiments, multiple cables may terminate to the same mating portion.

Figure 10A:
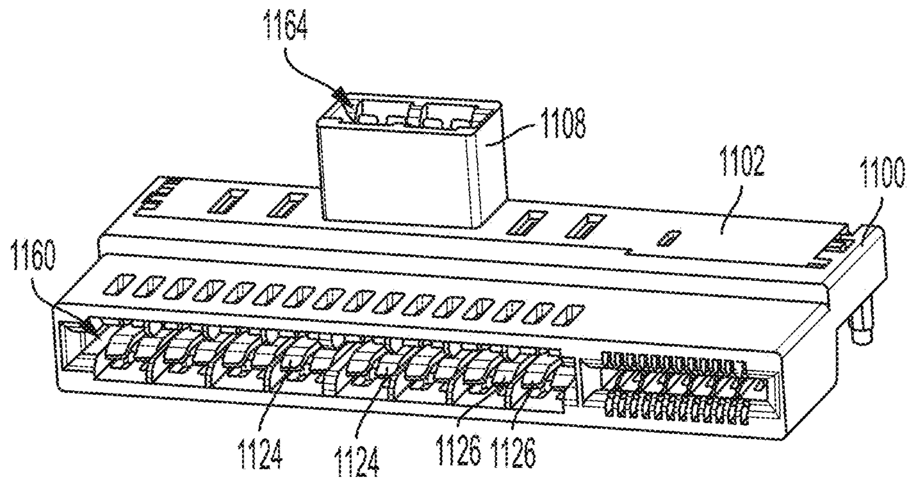
FIGS. 10A-10B are perspective views of alternative embodiments of a connector configured for power tap off.
Figure 10B:
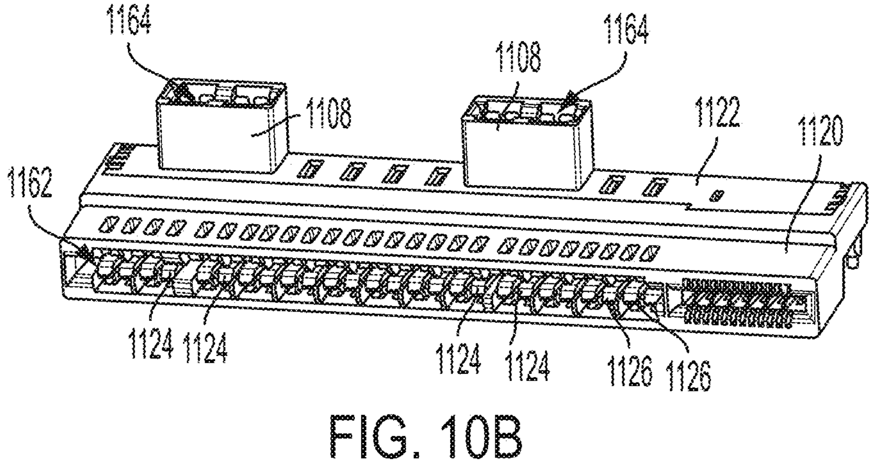

FIGS. 10A-10B illustrate alternative embodiments of the a connector configured for use in a system in which a first portion of the power supplied through a connector may be delivered to an electrical assembly (e.g., a PCB, another connector, etc.) through a mounting interface of the connector and a second portion may be delivered to a remote location on the electrical assembly through a conductive interconnect.

As shown in FIGS. 10A-10B, a connector housing, such as housing 1100 or housing 1120, may hold conductive elements that provide a plurality of mating interfaces. For example, in some embodiments, housing 1100 or housing 1120 may include a first plurality of conductive elements 1124 and a second plurality of conductive elements 1126. First plurality of conductive elements 1124 may be of a first type and second plurality of conductive elements 1126 may be of a second type.

In these examples, the first plurality of conductive elements 1124 have two mating contact portions and a tail for mounting to a PCB. One of the mating contact portions is positioned within mating interface 1160 or 1162 in a main body of housing 1100 or 1120 and the second in positioned within a chimney like projection 1108 extending from the main body. The second plurality of conductive elements 1126 have one mating contact portion and a tail for mounting to a PCB. The mating contact portion is positioned within mating interface 1160 or 1162 in a main body of housing 1100 or 1120, as in a conventional power connector. In this example, both the first and second plurality of contact elements have similarly shaped mounting tails and similarly shaped mating contact portions within the main body of housing. In this example, the mating contact portions of the first plurality of contact elements within projection 1108 are the same as the mating contact portions within the main body of the connector housing. However, it is not a requirement that all conductive elements have identical mating contact portions.

In the example of FIG. 10A, multiple ones of the first plurality of conductive elements 1124 are grouped together while multiple ones of the second plurality of conductive elements 1126 are grouped together. In this example, from left to right, in the embodiment of first housing 1100 (shown in FIG. 10A), first housing 1100 includes a first grouping of the second plurality of electrical mating interfaces 1126, followed by a second grouping of the first plurality of electrical mating interfaces 1124, followed by a third grouping of second plurality of electrical mating interfaces 1126. Alternatively, in the embodiment of second housing 1120 (shown in FIG. 10B), second housing 1120 includes a first grouping of the second plurality of electrical mating interfaces 1126, followed by a second grouping of the first plurality of electrical mating interfaces 1124, followed by a third grouping of second plurality of electrical mating interfaces 1126, followed by a fourth grouping of the first plurality of electrical mating interfaces 1124, followed by a fifth grouping of second plurality of electrical mating interfaces 1126.

Regardless of the number of groups and the shape of the conductive elements within each group, each group of first type conductive elements with mating interfaces within a projection 1108 may form a mating interface for power tap off via the connector. In the embodiment of FIG. 10A, one such tap off interface is shown. In the embodiment of FIG. 10B, two such tap off interfaces are shown. In some embodiments, a power connector may be configurable to have none, 1, 2, 3 or, in some embodiments, more tap off interfaces. The housing components may have multiple locations, each of which may receive a conductive element subassembly. Conductive element subassemblies with either the first type conductive elements or the second type conductive element may fit within each location. In this way, a connector may be assembled by inserting conductive element subassemblies with the first type conductive elements in locations at which a tap off interface is to be formed and conductive element subassemblies with the second type conductive elements in other locations.

The connector housing may also be configurable. As shown in FIGS. 10A and 10B, housings 1100 and 1120, respectively, are shaped to receive covers 1102 and 1122, respectively. Each of the covers may have an opening such that portions of conductive elements forming the tap off interface may pass through the cover. In this way, the housing may be configured for a desired number of tap off interfaces by attaching a cover with openings aligned with the desired number of tap off interfaces.

A cover may alternatively or additionally may enable the insertion of conductive element subassemblies into the connector housing. For example, a connector housing may be constructed with an open rear portion such that, with the cover removed, conductive element subassemblies of both the first and second type may be inserted from the rear. The cover may then be installed in a downward direction with openings in the cover aligned with the first type conductive elements that extend out of the housing at a power tap off interface.

Further, a cover may provide a mechanism to incorporate into a connector one or more projections 1108, which provide mechanical support for a desired number of tap off interfaces. Projection 1108 may be formed as an integral portion of or may be attached to cover 1102 in locations where there is an opening in the cover for mating portions of the first type conductive elements to pass through.

Regardless of the number of power tap off interfaces, each tap off interface may mate with a conductive interconnect, such as a bus bar or a cable assembly. In the embodiment of 10C, a connector is illustrated with a single power tap off interface and a cable assembly mated to that interface. The connector of FIG. 10C may be constructed using techniques as described above, and in this example is shown with a housing 1140 that has been configured to provide a power tap off interface to which a cable connector 1150 has been mated.

Cable connector 1150, for example, may have an opening configured to receive a projection 1108 that bounds the power tap off interface, as described above in connection with FIGS. 10A and 10B. Mating terminals within that opening may be configured to extend into the mating interface 1164 and make contact with the mating contact portions of the first type conductive elements at the mating interface 1164.

One or more mechanisms for mechanical support of cable connector 1150 and/or to secure cable connector 1150 to connector housing 1140 may be provided on the cable connector 1140 and/or the housing 1140. In this example, cable connector 1150 includes a latch 1152 with a hooked end that engages a complementary latching element on the connector housing 1140. For example, a projection 1108 may include a complementary latching element as shown in FIGS. 9A-9C. In those figures, a latching element 1022 extends from a projection forming a mating interface 1020. Latching element 1022 includes a ramped surface, leading to an abutment surface. During mating of a cable connector, latch 1152 may deflect as it slides along the ramped surface and then spring back when the hooked end of latch 1152 passes the ramped surface to engage the abutment surface.

Figure 10C:
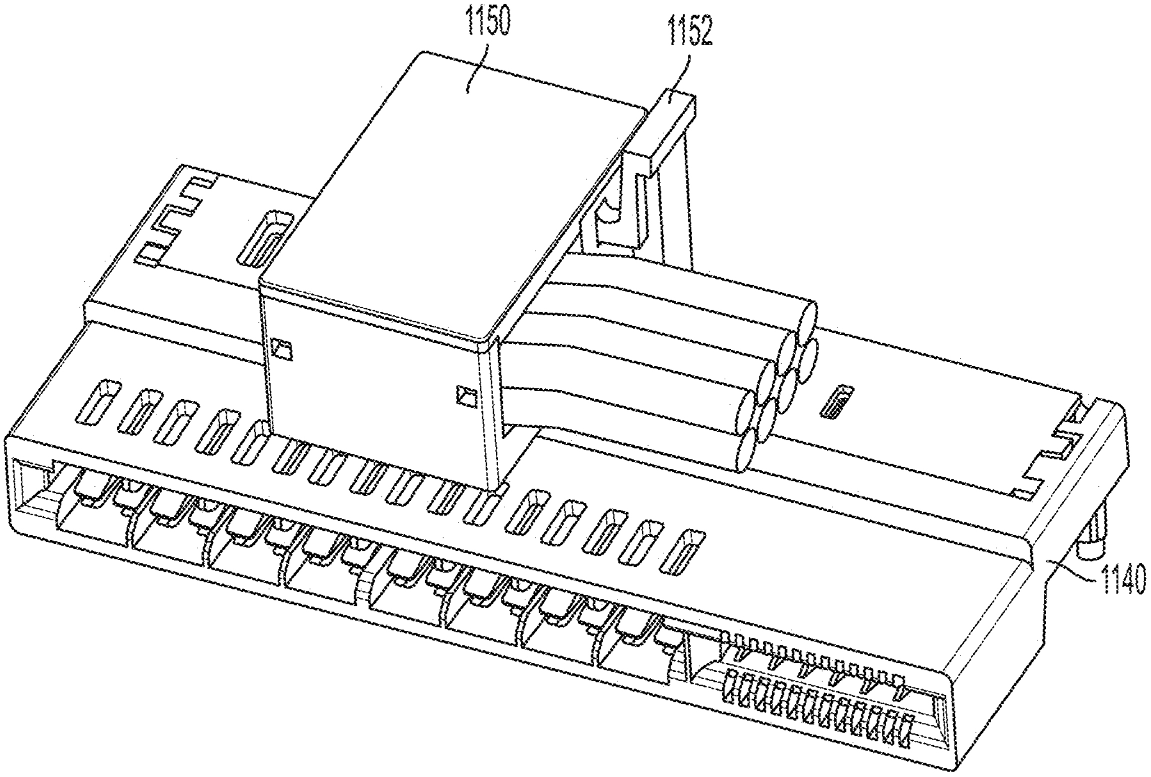
FIG. 10C is a perspective view of an alternative embodiment of a connector, mated with a cable assembly.
Figure 10D:
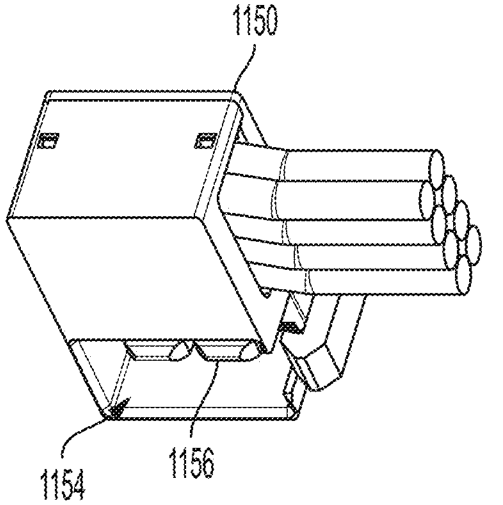
FIG. 10D is a bottom perspective view of the cable assembly of FIG. 10C.

FIG. 10D is a bottom view of a cable assembly including connector 1150 in an unmated position. In this perspective, opening 1154, sized to receive a projection 1108 is visible. Mating contacts 1156 of conductive elements within the visible within opening 1154. In the embodiment illustrated in FIGS. 10A and 10B, each of the mating interfaces 1164 is formed from two conductive element subassemblies. A corresponding number of mating contacts 1156 are shown in FIG. 10C, each aligned with one of the conductive element subassemblies.

Figure 10E:
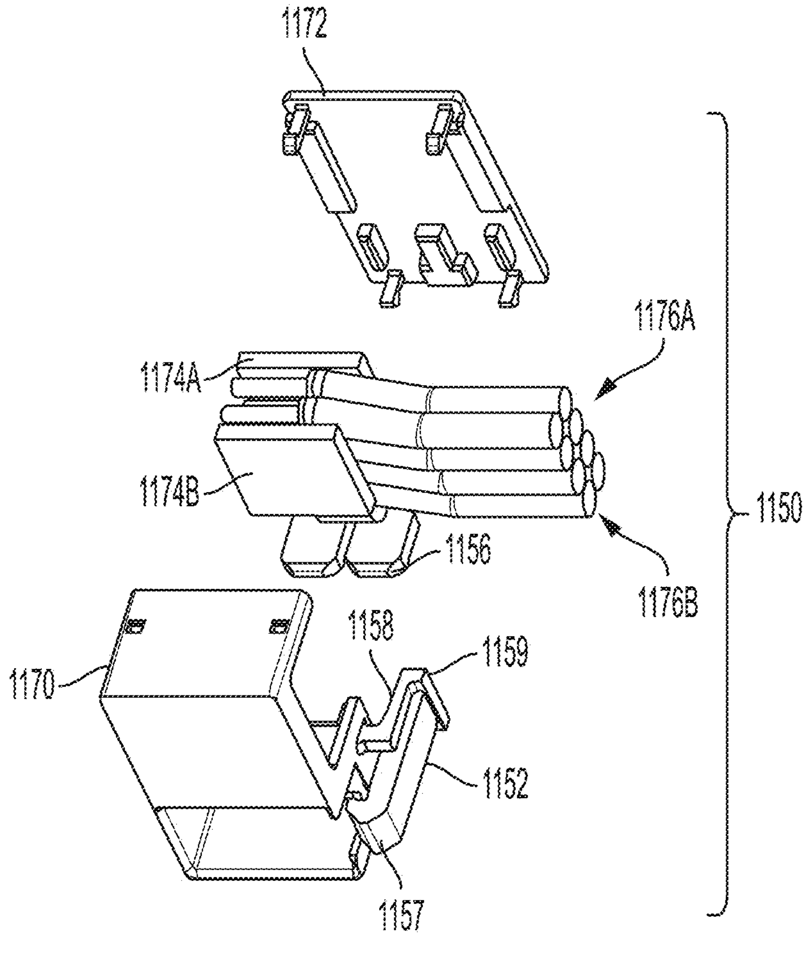
FIG. 10E is an exploded view of the cable assembly of FIG. 10D.

FIG. 10E is an exploded view of the cable assembly with connector 1150. In this example, connector 1150 includes a housing 1170 and a cover 1172. These components may be made of an insulative material, such as a polymer with reinforcing filler, such as glass fibers. Housing 1170 and a cover 1172 may be made with interlocking features, such as snap-fit features, such that cover 1172 may be attached to housing 1170 after conductive elements 1174A and 1174B are inserted into housing 1170.

One or more cables are attached to each of the conductive elements 1174A and 1174B. In this example, cable groups 1176A and 1176B are attached to conductive elements 1174A and 1174B, respectively. Here, each cable group 1176A and 1176B includes one or more cables, and are here shown with four cables. However, the groups may have other than four cables and may have different numbers of cables than each other. Each of the conductive elements 1174A and 1174B has a first end to which the cables of a group are electrically and mechanically connected, such as by welding, brazing, soldering or crimping. A mating contact portion 1156 is formed at a second end of each of the conductive elements 1174A and 1174B.

Housing 1170 and/or cover 1172 may be shaped to hold conductive elements 1174A and 1174B in position for mating to the complementary conductive elements at a mating interface 1162. Additionally, housing 1170 supports latch 1152. Latch 1152 is joined to housing 1170 via flexible arm 1158, which may, for example, be integrally molded with the rest of housing 1170 from a polymer such that flexing of arm 1158 enables the hooked end 1157 of latch 1152 to pivot. As described above, hooked end 1157 may pivot during mating such that the hooked end 1157 may engage a latching element 1022 of a mating connector. Pivoting may also support un-mating. As shown, latch 1152 includes an actuation end 1159 opposite hooked end 1157. Actuation end 1159 is positioned for a user to press it towards housing 1170, causing the hooked end 1157 to pivot away from, and disengage from a latching element 1022 of a mating connector.

FIGS. 10D and 10E show a cable assembly formed by terminating cables groups 1176A and 1176B with a connector 1150. A second end of the cable assembly is not shown. However, the cable assembly may be used as a conductive interconnect as described herein. The second end of the cable groups 1176A and 1176B, for example, may be terminated with a conventional cable connector and mated to a conventional connector mounted at an interior location on a PCB to which the connector with power tap off is mounted. However, other connections are possible.

Figure 11A:
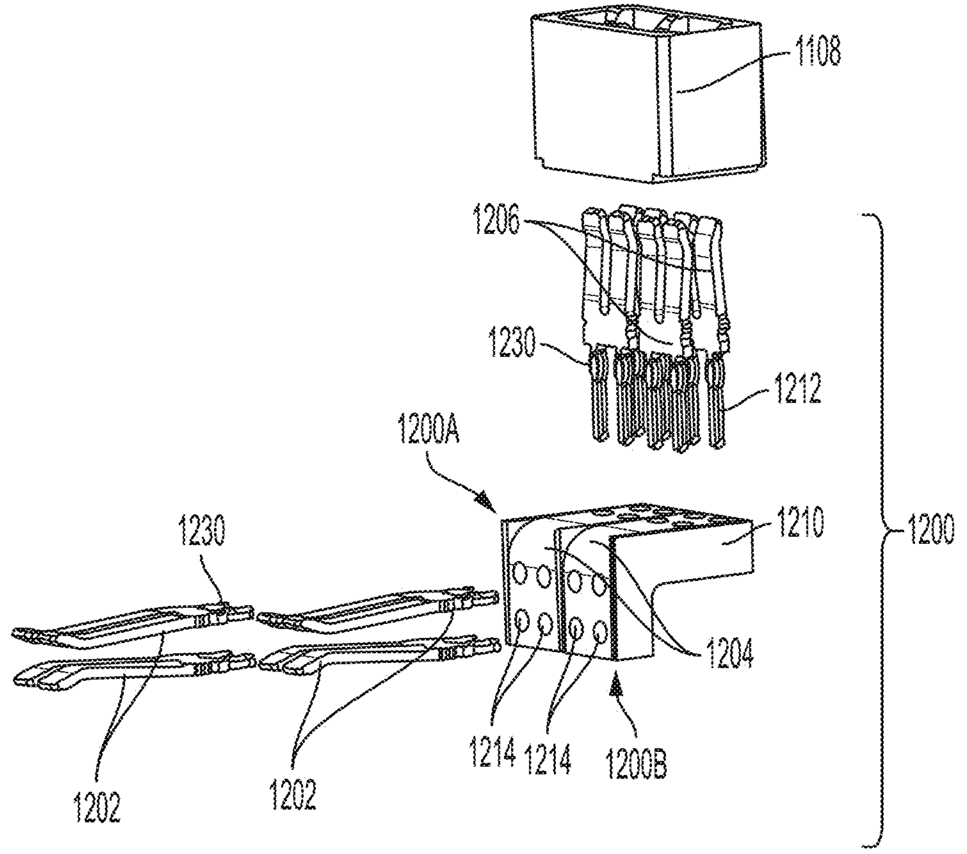
FIG. 11A is an alternative embodiment of conductive elements within an electrical connector, in combinations with a portion of a housing of an illustrative connector.
Figure 11B:
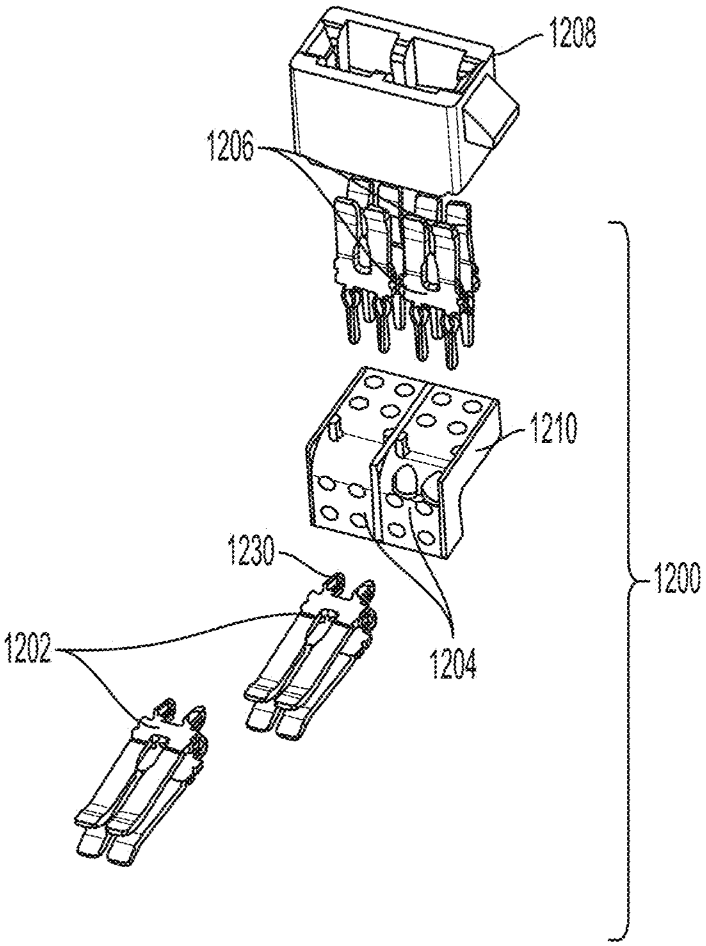
FIG. 11B is an alternative embodiment of conductive elements within an electrical connector, in combinations with a portion of a housing of an illustrative connector.

FIG. 11A-11B is an exploded perspective view of conductive element subassembly 1200 according to some embodiments. In these examples, the conductive element subassemblies are shown relative to a portion of a connector housing providing mechanical support for a mating interface for power tap off, such as projection 1108 described above. It should be appreciated that projection 1108 is shown separate from the rest of a connector housing 1100, 1120 or 1140 for simplicity of illustration. In some embodiments, projection 1108 may be a separately manufactured component that is then attached to the rest of the connector housing. In other embodiments, however, the projections 1108 may be manufactured as an integral part of the housing or a cover for the housing.

In this example, conductive element subassembly 1200 includes two conductive elements 1200A and 1200B of the first type, side by side. Each conductive element 1200A and 1200B has mating contact portions at two interfaces and tails at a mounting interface. In this configuration, a single conductive element subassembly may be used to form a power tap off interface 1164, which similarly includes two conductive elements. It is not a requirement, however, that each conductive element subassembly 1200 have the same dimension as a power tap off interface 1164. A power tap off interface 1164, for example, may be formed with multiple conductive element subassemblies 1200. Further, in embodiments in which a conductive element subassembly includes a plurality of conductive elements, it is not a requirement that all of the conductive elements be identically configured. Some conductive elements, for example, may be of the first type, while others may be of the second type.

In the example illustrated in FIG. 11A, conductive element subassembly 1200 includes two or more members that collectively provide interconnected mating contact portions for multiple mating interfaces and a mounting interface. In the specific example, there are mating contact portions for two mating interfaces and tails for a mounting interface. In this example, separate members, joined through a further member, provide mating contact portions for two mating interfaces. In this example, the tails are integral with members providing mating contacts for one of the mating interfaces. In other embodiments, the tails may be separately formed with respect to the mating contact portions and/or members with multiple integrally formed mating contact portions may be alternatively or additionally used.

In FIG. 11A, conductive element subassembly 1200 includes a plurality of first members 1202, a plurality of second members 1204, a plurality of third members 1206 and an organizer 1210. organizer 1210 Organizer 1210 may be formed of an insulative material, while other portions of the subassembly may be conductive.

In the embodiment illustrated, each of the plurality of first members 1202 may provide mating contact portions for a first interface, such as an interface to mate with a power supply. The plurality of third members 1206 may provide mating contact portions for a second interface, such as a power tap off interface. The plurality of second members 1204 may electrically connect the plurality of first members 1202 and the plurality of second members 1204. In this example, the third members 1206 include tails 1212 for connection to a PCB. Here, the tails are shown configured for through hole soldering to a PCB, but tails of other configurations may alternatively or additionally be used.

In some embodiments, first and third members 1202, 1206 may include mating contact portions configured as one or more beams or spring fingers. In such embodiments, the mating components mated to first and third members 1202, 1206 are shaped to form a mating interface with first and/or third members 1202, 1206. For example, the mating components may include pads or tabs with a flat surface positioned for the beams of the first and third members to press against. In the example of FIG. 11A, first and third members 1202, 1206 have mating contact surfaces on inwardly facing surfaces of the beams. In this way, the mating contact portions are configured to mate with a structure inserted between the opposed beams. Of course, first and third members 1202, 1206 may take on any suitable shape. For example, first and third members 1202, 1206 may be trident shaped, spike shaped, or any other suitable shape. Further, in the illustrated example, each of the conductive elements 1200A and 1200B includes two first members 1202 and two third members 1206, which are connected together through a second member 1204. Such a configuration may be useful in mating to a tab such as 1156 in which opposite surfaces are at the same potential. For connecting to a mating contact portion that may have opposite surfaces at different potentials, such as the bus bar illustrated in FIG. 5, members shaped as first members and/or third members may be coupled to separate second members, such that opposing mating contact portions are isolated from each other within the connector.

In some embodiments, the second member 1204 may be shaped to provide a desired orientation of first members 1202 relative to third members 1206. For example, in some embodiments, such as the embodiment of FIGS. 11A-11B, second members 1204 are L-shaped (i.e., curved at approximately 90 degrees). As such, in that embodiment, first and third members 1202, 1206 are approximately perpendicular to one another. Of course, in some instances it may be desirable to position first and third members 1202, 1206 at a different angle relative to one another (i.e., not perpendicularly). By decreasing the angle of curvature of second member 1204, a greater angular offset between first members 1202 and third members 1206 may be achieved. Relatedly, by increasing the angle of curvature of second member 1204, a lesser angular offset between first members 1202 and third members 1206 may be achieved. The angular offset, for example, may be in the range from 30 degrees to 180 degrees, or between 45 and 140 degrees, or between 90 and 140 degrees, in some embodiments.

First, second and third members are electrically and mechanically connected. The connection may be formed, for example, via welding, brazing, soldering. Alternatively or additionally, an attachment mechanism may be included that facilitates simple connection of the first and/or third members to the second member while the second member so as to enable configuration of a connector with 0, 1, 2 or more power tap offs. Those connections may be formed, for example, after the second member is installed within a connector housing.

Figure 12:
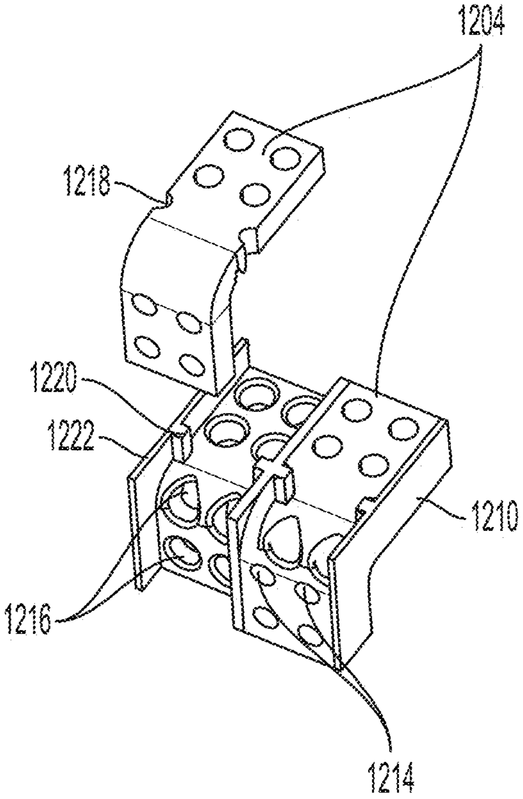
FIG. 12 is an alternative embodiment of conductive elements within an electrical connector.

The first, second and/or third members may include features to enable second member 1204 to register (e.g., electrically connect or otherwise fit together) with first and/or third members 1202, 106. In the illustrated embodiment, connections are formed as press fit connections. For example, as shown in FIGS. 11-12, second members 1204 may include a plurality of holes 1214. Each of the first and third members may include press fits 1230. Here the press fits are “eye of the needle” press fits, such as may be used for making press fit connections to a PCB. The eye of the needle press fit is formed in an elongated member with a widened portion. A hole through the widened portions leaves two relatively thin walls of the elongated member on either side of the hole. When the elongated member is pressed into a hole that has a diameter smaller than the widened portion, the relatively thin walls may be compressed towards each other such that the width of the widened portion reduces to allow the press fit to enter the hole. In this state, the widened portion is in compression and presses against the walls of the hole with sufficient force to make a mechanical connection between the member and the hole. When both the member and the interior of the hole are conductive, an electrical connection can also be formed.

In this example, holes 1214 may be sized and shaped to accept the compressed press fits 1230 of first and third members 1202, 1206 such that first and second members 1202, 1206 are electrically and mechanically coupled to second member 1204. Holes 1214 may be further configured to hold first and third members 1202, 1206 in a particular orientation relative to second member 1204 (e.g., approximately perpendicularly in the illustrated embodiment). Thus, first and third members 1202, 1206, may register with second member 1204.

In the illustrated embodiment, each of the third members 1206 includes a tail 1212 extending beyond a press fit 1230. Third members 1206 may be pressed into second member 1204 sufficiently far that the press fits 1230 of third members 1206 engage with the second member 1204, and the tails may extend through the second member 1204, where they are exposed to form a mounting interface.

Though conductive element subassembly 1200 is shown to have two second members in FIGS. 11A-11B, this need not be the case. In some embodiments, electrical mating interface 1200 may include a single second member 1204, three second members 1204, or four or more second members 1204. The same may be true for first and third members 1202, 1206. As shown in FIG. 11A, conductive element subassembly 1200 may include four of each first and third electrical members 1204, 1206, though this need not be the case. For example, conductive element subassembly 1200 may include three or fewer first and third members 1202, 1206, or five or greater first and third electrical members 1202, 1206. While in some instances conductive element subassembly 1200 may include the same number of first and third members, 1202, 1206, this need not be the case as electrical contact 1200 may alternatively include different numbers of each first member 1202 and third member 1206, depending on the application.

In some instances, third members 1206 may each include a tail 1212. Tail 1212 may be capable of further electrically connecting third members 1206 to a second electrical assembly, such as a PCB, connecting cable, or other suitable assembly. In this example, tails 1212 are configured for connection to a PCB. Tail 1212 may be configured to extend along the length of or substantially parallel to the body of third members 1206. While in some instances each of third members 1206 may include a tail 1212, this need not be the case. For example, in some embodiments, some of third members 1206 may include a tail 1212, while others do not.

First, second, and third members 1202, 1204, 1206 may be made of any suitable material. For example, first, second, and third electrical members 1202, 1204, 1206 may be made of aluminum, zinc, iron, nickel, platinum, copper, or any other suitable electrically conductive material. Of course, any suitable combination of materials may be used, depending on the application.

First, second, and third members 1202, 1204, 1206 may be sized with a mass that provides a target current rating. In some embodiments, first and third members 1202, 1206 each have a first mass per unit length, while second members 1204 each have a second mass per unit length greater than the first mass. Though in some embodiments, first and third members have the same mass, in other embodiments, first and third members 1202, 1206 have different masses per unit length. Variations in mass per unit length may be achieved by using different materials and/or members of different thickness.

FIG. 11B illustrates a conductive element subassembly 1200 used in a connector housing with a projection 1208. latching element In some embodiments, conductive element subassembly 1200 includes an organizer 1210. As shown in FIG. 12, organizer 1210 may provide mechanical support to second members 1204. Organizer 1210 may alternatively or additionally support other members of conductive element subassembly 1200, either through direct contact with the members or indirect contact, such as a result of other members being connected to second members 1204. In some embodiments, organizer 1210 may include a plurality of holes 1216 that register (e.g., are aligned or concentric with) with holes 1214 of second member 1204. Thus, first and third members 1202, 1206 may register with second members 1204 as described above. Accordingly, press fits 1230 and tails 1212 may first pass through holes 1214 of second member 1204, then pass into or through holes 1216 in organizer 1210. Thus, organizer 1210 may allow first and third members 1202, 1206 to interface with second member 1204 in any suitable manner.

Moreover, organizer 1210 may be configured such that second contact portions 1204 may nest within organizer 1210. For example, organizer 1210 may include a sidewall 1222. Sidewall 1222 may be geometrically complementary to second contact portions 1204 such that second contact portions 1204 nest within organizer 1210. Further, sidewall 1222 may include one or more protrusions 1220 configured to hold second contact portions 1204 in place, while second contact portions 1204 nest within organizer 1210. For example, second contact portions 1204 may include one or more indents 1218 complementary to one or more protrusions 1220, thus, preventing second contact portions 1204 from sliding about when nesting within organizer 1210.

Further, organizer 1210 may serve to electrically insulate second member 1204 from an external environment. Organizer 1210 may be made of any suitable electrically insulated material (e.g., liquid crystal polymers (LCPs), polyphenyline sulfide (PPS), high temperature nylon, polyphenylenoxide (PPO), polypropylene (PP), etc.).

Although FIG. 12 illustrates organizer 1210 as being capable of accommodating two second members 1204, this need not be the case. Of course, organizer 1210 may be constructed to accommodate one second member 1204. In some instances, however, organizer 1210 may be configured to accommodate three, four, or five or more second members 1204, depending on the application.

Here, organizer 1210 is shown as a separate component. In other embodiments, organizer 1210 may be formed integrally with housings 1100, 1120 or 1140.

Accordingly, in some embodiments, conductive element subassemblies 1200 may be assembled and then inserted into a connector housing. In other embodiments, some or all of the members of conductive element subassemblies 1200 may be assembled in situ. For example, a connector housing may be molded with organizers 1210 integrally formed with the body of the housing. Second members 1204 may then be added in one or more contact locations. Second members 1204, for example, may be inserted through an opening in the location of covers 1102 or 1122 (FIGS. 10A and 10B). The covers may then be added such that an opening for a first mating interface is provided at one side of the connector and an opening for a power tap off interface is provided in a projection 1108. Multiple first members and third members 1202 and 1206 may be inserted into these openings such that their press fits 230 engage with a second member 1204. The mating contact portions of the first members and third members 1202 and 1206 may thus be positioned in their respective mating interfaces.

These components may be assembled in other orders. For example, the projections, such as projection 1108 may be added after the first members and/or third members 1202 and 1206 are inserted.

FIGS. 11A and 11B illustrate conductive element subassemblies 1200 for first type conductive elements with mating contact portions for two mating interfaces and contact tails for one mounting interface. Similar construction techniques may be used for conductive element subassemblies for the second type conductive elements. For example, a second type conductive element subassembly may be formed with first members 1202, second members 1204 and an organizer 1210 as illustrated. Third members 1206 may be formed without press fits 1230, but without contact fingers. Forming both first and second type conductive element subassemblies by connecting members with mating contact portions and/or tails via second members 1204 pre-installed in the connector housing enables modular components to be assembled into any of multiple connector configurations with few or no differences between the components. For example, a connector with one power tap off interface as shown in FIG. 10A may be assembled from substantially the same components as a connector with two power tap off components, differing only in the shape of a cover, such as cover 1102 or 1122. Accordingly, in some embodiments, a connector housing will include multiple contact locations, each with a conductive member adapted to receive mating contact portions and/or contact tails such that the function of the conductive element at each contact location may be configured through insertion of additional members.

Alternatively or additionally, some or all of the second type conductive element subassemblies may be formed as conventional terminals in a power connector. The terminals, for example, may be stamped from a sheet of metal with mating contact portions and tails joined through the body of the terminal.

Figure 13:
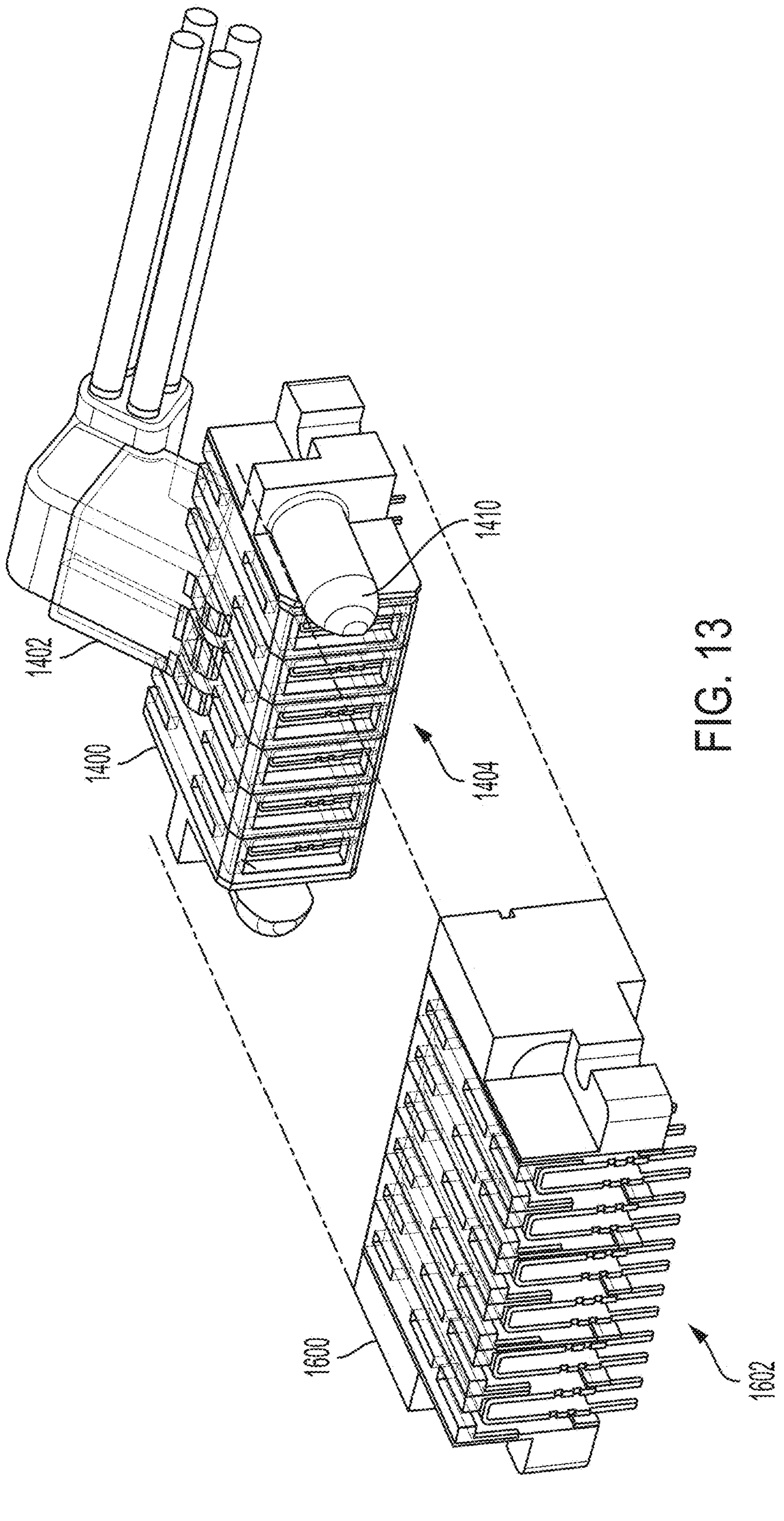
FIG. 13 is a perspective view of a connector with cable tap off, mated to a cable assembly with a mating connector.

Regardless of the construction techniques employed to incorporate mating contacts into a connector, the mating contact portions may be configured based on the type of mating component intended for mating at each mating interface. Embodiments are described above in which a mating interface, such as mating interface 1160 or 1162 is shaped to receive a card edge. In other embodiments, a connector with a power tap off interface may be formed with a mating interface configured to mate with a mating connector. FIG. 13 illustrates a connector 1400 with a cable tap off interface 1402 and a mating interface 1404 configured to mate with a second connector, such as connector 1600. Mating interface 1404, in addition to incorporating openings to receive terminals from mating connector 1600 includes guidance features 1410 that are designed to engage complementary guidance features in connector 1600. In this example, connector 1600, like connector 1400, includes a mounting interface 1602 for mounting to a PCB.

Figure 14A:
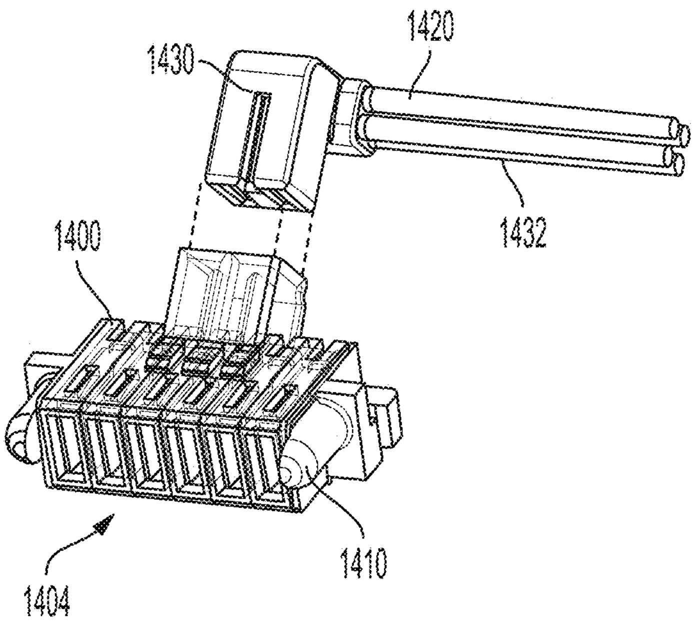
FIG. 14A is a perspective view of the connector with cable tap off of FIG. 13 with a cable assembly positioned for mating with the connector.

FIG. 14A shows a cable assembly 1420 positioned for mating with the cable tap off interface 1402 of connector 1400. In this example, connector 1430 terminates one end of the cables 1432 and mates with connector 1400 at cable tap off interface 1402. In this example, connector 1430 mates with the cable tap off interface 1402 at an angle that is other than 90 degrees with respect to mating direction of mating interface 1404. Such a configuration may lead to effective cooling in an electronic assembly using a connector with a cable tap off, which may enable higher performance processors or other electronic components to be used in the electronic assembly and/or for lower cost cooling components to be used.

Figure 14B:
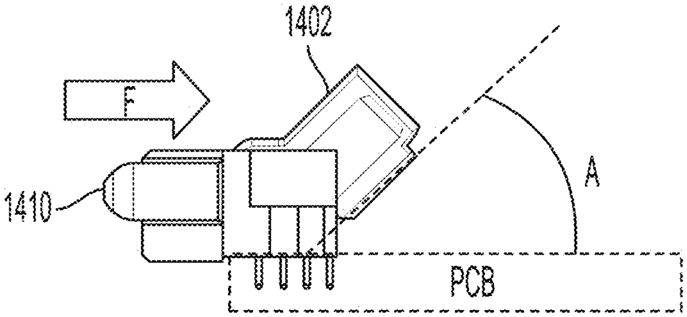
FIG. 14B is a side view of the connector with cable tap off of FIG. 13.

As illustrated schematically in the cross section of FIG. 14B, a connector, such as connector 1400 may be mounted to a PCB. That PCB may be installed in an enclosure that is cooled by air flowing over the PCB dissipating heat radiated by components mounted to the PCB. That flow F of cooling air is traditionally caused by a fan (not shown) mounted in the assembly. To flow over components on the PCB, the flow F frequently must flow over the connector. A power tap off interface, such as cable tap off interface 1402 has the potential for impeding that flow of air, particularly near the surface of the PCB. As a result, the cooling effectiveness may be decreased. In some scenarios, a decrease in cooling effectiveness can lead to premature failure of the components, require use of less powerful components that generate less heat and/or require additional expense in the manufacture of the assembly associated with additional cooling capability.

The inventors have recognized and appreciated that angling the power tap off interface as shown in FIG. 14B enables more effective airflow. In the embodiment illustrated, the power tap off interface has a mating direction that is offset from the surface of the PCB to which connector 1400 is configured to be attached by an angle A less than 90 degrees. For example, the angle A may be between 35 and 75 degrees, such as between 40 and 50 degrees in some embodiments. In this configuration, the power tap off interface may nonetheless be separated from the surface of the PCB sufficiently to enable components to be mounted to the PCB adjacent the connector 1400. Thus, in many embodiments this range of angles can enhance cooling without requiring extra space on the PCB, which could increase costs or reduce functionality for other reasons.

With this orientation, the mating direction of the power tap off interface may be angled with respect to the mating direction of mating interface 1404 between 105 degrees and 165 degrees, such as between 130 and 140 degrees.

Figure 14C:
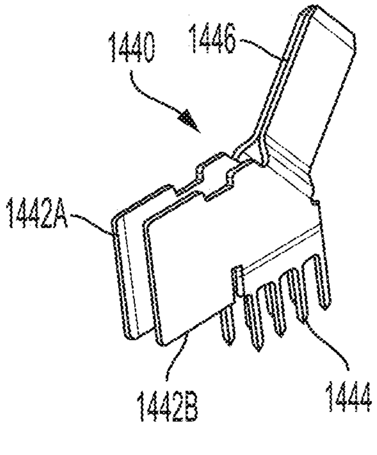
FIG. 14C is a perspective view of the terminal of the connector with cable tap off of FIG. 13.

FIG. 14C illustrates a conductive element 1440 for use in a connector 1400 at contact locations for which a cable tap off is provided. In this example, conductive element 1440 includes mating contact portions 1442A and 1442B, shaped in this embodiment as blades. The blades are connected through the body of the conductive element to tails 1444 providing a mounting interface. Conductive element also includes a second mating contact portion, here shown as a blade 1446. In this example, conductive element 1440 may be formed by stamping a sheet of metal and then folding the sheet into the double-blade configuration illustrated. In this example, blade 1446 is angled with respect to mating contact portions 1442A and 1442B between 105 degrees and 165 degrees, such as between 130 and 140 degrees.

Figure 15A:
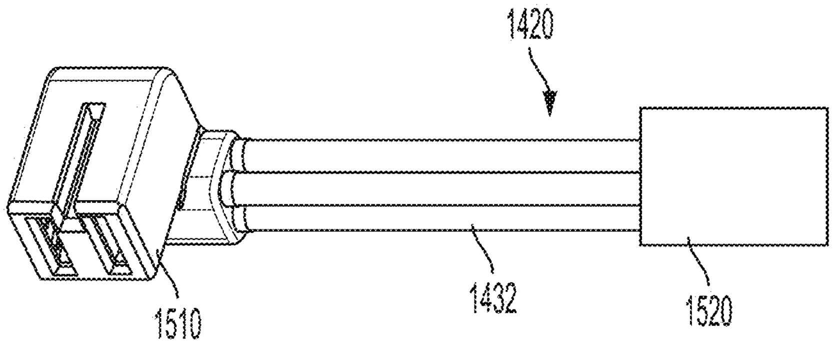
FIG. 15A is a perspective view of a cable assembly configured for mating with the connector with cable tap off of FIG. 13.

FIG. 15A provides further detail of a cable assembly 1420. In this example, cables 1432 are terminated at one end with a connector 1510 configured to mate with cable tap off interface 1402. A second end of the cables 1432 maybe connector to a second connector, shown schematically as connector 1520. Connector 1520 may have a mating interface compatible with a connector remote from connector 1400, such as a connector 454.

Figure 15B:
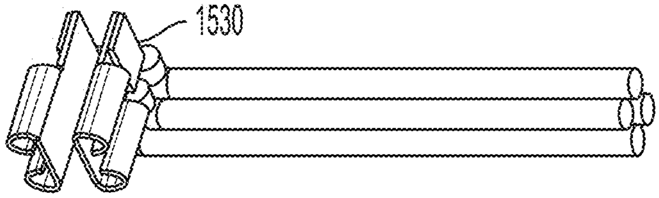
FIG. 15B is a perspective view of the cable assembly of FIG. 15A with the housing cut away.

FIG. 15B shows the first end of cable assembly 1420 with a housing of connector 1510 removed. In this configuration terminals 1530 terminating one or more of the cables 1432 are visible. In this example, example, each of the terminals 1530 is connected to two of the cables 1432. The connection may be made, for example, by folding a portion of the terminal 1530 over conductors of the cable and crimping the conductors in the fold. Soldering, welding, brazing or other attachment techniques may alternatively or additionally be used. In this example, terminals 1530 are each shaped to engage a blade 1446.

Figure 16:
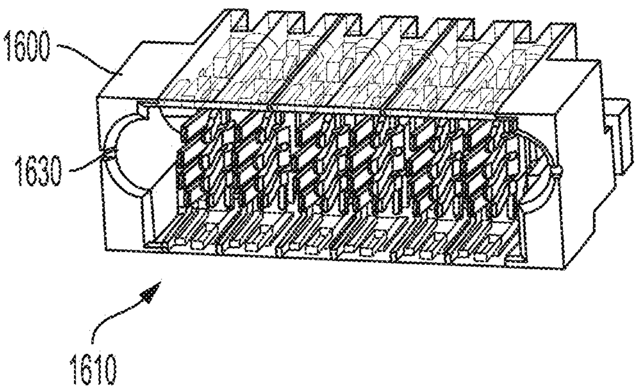
FIG. 16 is a front perspective view of the mating connector of FIG. 13.

FIG. 16 shows a mating interface 1610 of connector 1600. In this example, the mating contact portions of the conductive elements within connector 1600 each have a plurality of spring fingers or beams. In this configuration, the mating contact portions of connector 600 mate with eth mating contact portions of the conductive elements within connector 1400. Additionally, the mating interface includes alignment features 1630 that are complementary to alignment features 1610.

Figure 17A:
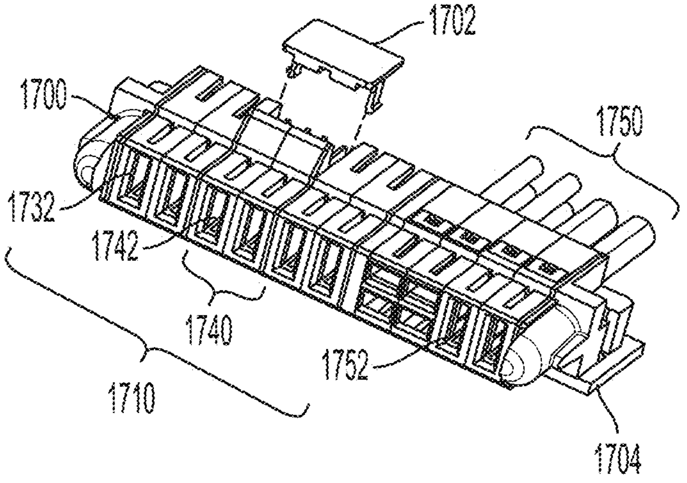
FIG. 17A is a front perspective view of an alternative embodiment of a connector with cable tap off, with a cover for a cable tap off interface shown separated from the connector.
Figure 17B:
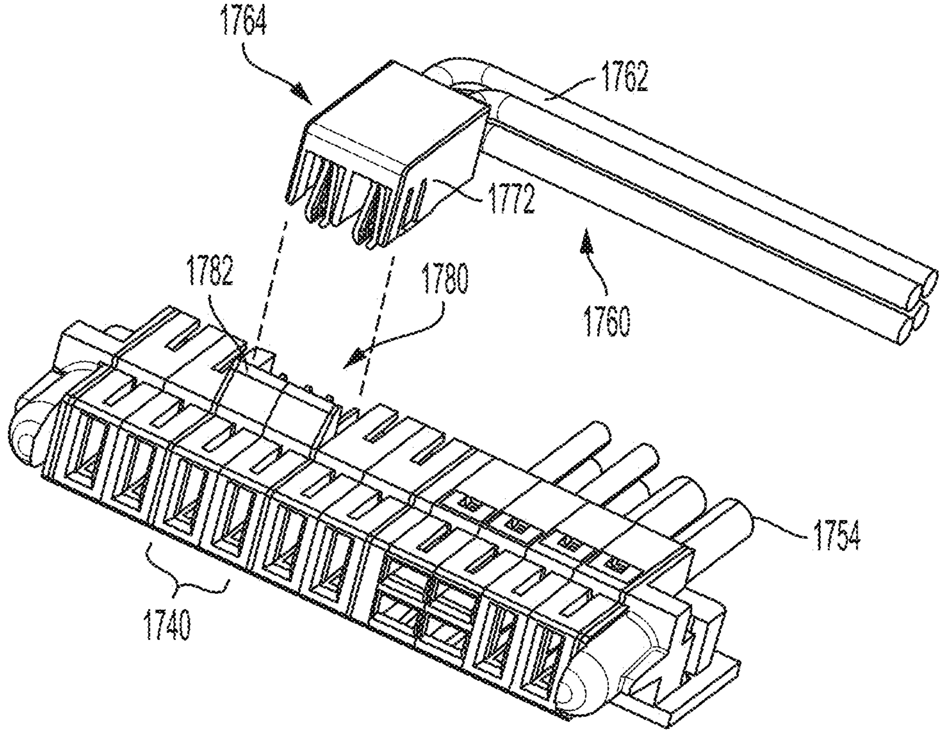
FIG. 17B is a front perspective view of the connector of FIG. 17A with a cable assembly configured for mating with the connector at the cable tap off interface.

FIGS. 17A and 17B illustrate a further embodiment of a connector configured for use in high performance electronic systems. In this example, connector 1700 is configured to optionally support passing current through a tap off interface 1780 to make a connection between cables 1762 of a cable assembly 1760 and a mating connector. The mating connector is not shown in FIG. 17A but may include a housing and terminals as described above, such as in connection with FIG. 16, to mate with the terminals of connector 1700 at a mating interface of connector 1700. Alternatively or additionally, though not expressly illustrated in FIG. 17A, the mating interface of connector 1700 may receive a card edge or other mating component.

As described above, when a cable assembly is mated to the cable tap off interface, current passing through the mating interface of connector 1700 may split to partially flow into the cables of a cable assembly mated to the tap off interface and may partially flow into a PCB 1704 to which the connector 1700 is mounted.

In the example of FIG. 17A, connector 1700 includes board mount connector portion 1710. Terminals of connector 1700 within board mount connector portion 1710 have tails to mount to printed circuit board (PCB) 1704. The terminals also have mating portions disposed at the mating interface to make contact with a mating component, such as a mating connector or a card edge, as discussed above. In this example, connector 1700 is configured as a receptacle connector and the mating contact portions are flat regions of the terminals disposed within mating regions such as 1732 and 1742. However, other terminal configurations, such as spring fingers, may be used.

Figure 17C:
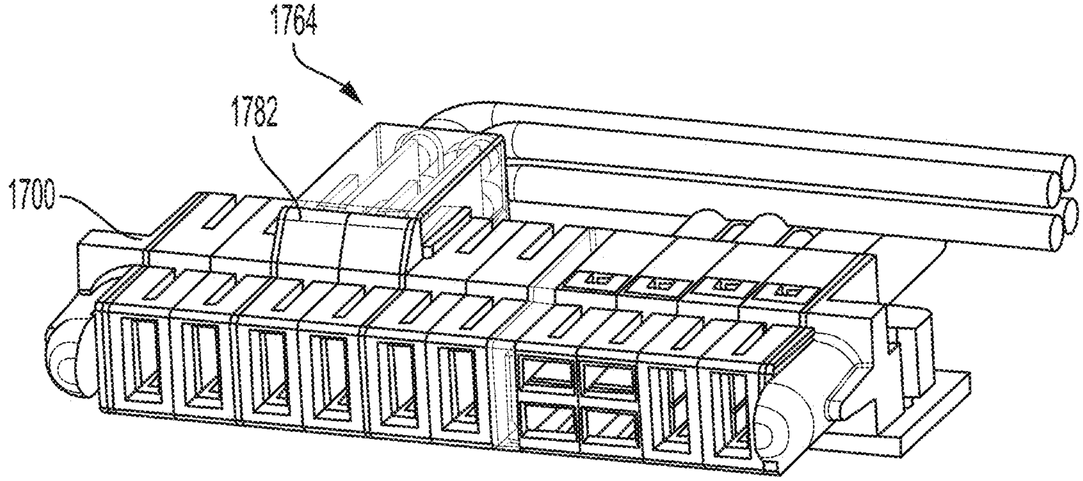
FIG. 17C is a front perspective view of the connector of FIG. 17A with a cable assembly mated with the connector at the cable tap off interface.

Within tap-off section 1740, a portion of the terminals may also be additionally exposed at cable tap off interface 1780 where they can mate with a connector 1764 of a cable assembly 1760. FIG. 17A illustrates a cover 1702, which may snap into an opening in a housing of connector 1700 to cover cable tap off interface 1780. Cover 1702 may be removed for mating with another component for cable tap off. FIG. 17A shows cover 1702 separated from connector 1700. FIG. 7B shows cover 1702 removed entirely and a cable assembly 1760 positioned for mating to tap off interface 1780. FIG. 17C illustrates cable connector 1764 mated to connector 1700 at cable tap off interface 1780.

A housing of connector 1700 may be shaped to receive connector 1764 at the cable tap off interface 1780. Additional features may be included on the housing to provide a low resistance airflow path over connector 1700 when it is mounted to a PCB in an electronic system that is air cooled, such as with a fan positioned to draw air over connector 1700 and/or other components (not shown) mounted to PCB 1704 or elsewhere within the system. In this example, those features include baffles 1782. Baffles 1782 provide a ramped surface from an upper, exterior surface of the mating portions of cable tap off portion 1740. As shown in FIG. 17C, the ramped portion extends to the upper surface of housing 1772 when connector 1764 is inserted into the cable tap off interface 1780. In this example, baffles 1782 are ramped at approximately a 45-degree angle with respect to the upper surface of the connector housing. An angle within the range of 30 to 60 degrees, for example, may be used.

Optionally, the connector 1700 may include a pass-through segment 1750 in which a high current connection is made from the mating interface to cables 1754 extending from connector 1700. In the illustrated example, terminals within pass-through segment 1750 are connected to the conductors of cables 1754, but not to PCB 1704. In this case, the current passing through the mating interface in mating regions 1752 in pass-through segment 1750 are not connected to PCB 1704. Some or all of the terminals within pass-through segment 1750 may alternatively or additionally be connected to PCB 1704.

FIGS. 17A . . . 17C illustrate that some of the terminals in pass-through segment 1750 are mounted with their mating portions perpendicular to a mounting face of connector 1700, which is configured to face PCB 1704 when connector 1700 is mounted to PCB 1704). Other terminals are mounted with mating portions parallel to the mounting face of connector 1700. The mating portions may otherwise be the same.

Other configurations of the mating portions of the terminals in pass-through segment 1750 are possible. The terminals within pass-through segment 1750, for example, may all have the same orientation. Alternatively or additionally, terminals within board mount connector portion 1710 may have a mix of orientations. As a further variation, terminals in any of the segments may alternatively or additionally have varying sizes or configurations.

Figure 18:
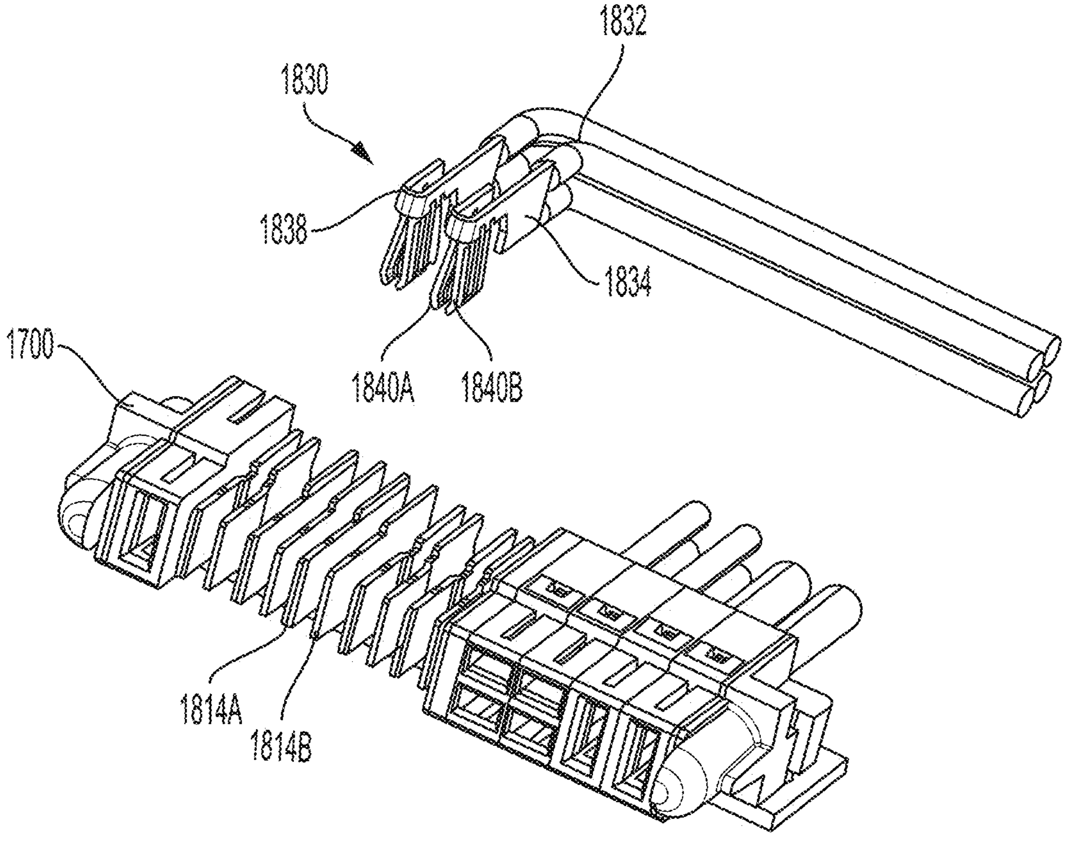
FIG. 18 is a front perspective view of the connector and cable assembly of FIG. 17B with portions of the connector housing and the housing of a cable assembly connector assembly cut away.

FIG. 18 is a partially cutaway view of connectors 1700 and 1764. In this illustration, housing 1772 is cutaway. Likewise, a portion of the housing of connector 1700 is cutaway, revealing terminals, including terminals 1916A and 1916B within board mount connector portion 1710 and terminals 1814A and 1814B within tap-off section 1740.

In this view, terminals 1830 within connector 1764 are also visible. Each of the terminals 1830, in this example, is attached to the conductors of two cables, such as with crimps 1832. Attachment techniques such as soldering or welding may alternatively or additionally be used. Also, a terminal may terminate more or fewer cables than illustrated.

Terminals 1830 in this example also include a body portion 1834, with an extending U-shaped segment 1838. The U-shaped segment 1838 has opposing sides from which spring fingers 1840A and 1840B, respectively extend. In this example, three spring fingers extend from each side of U-shaped segment 1838. However, more or fewer spring fingers may be used. In this example, spring fingers 1840A and 1840B may have the same configuration as spring fingers illustrated in connection with connector 1600. Using terminals 1830 of the same type as in a connector mating with connector 1700 may facilitate distribution of current, simplify use of the connector in an overall system and/or provide other benefits. In this example, terminals 1830 may be made of the same material, with the same thickness, and/or the same number of contacts as are used in a connector designed to mate with connector 1700.

In the illustrated example, spring fingers 1840A and 1840B have mating contact surfaces facing away from each other. When connector 1764 is mated to connector 1700 at mating interface 1780, the spring fingers 1840A and 1840B fit between a pair of terminals in connector 1700, such as terminals 1814A and 1814B.

Figure 19B:
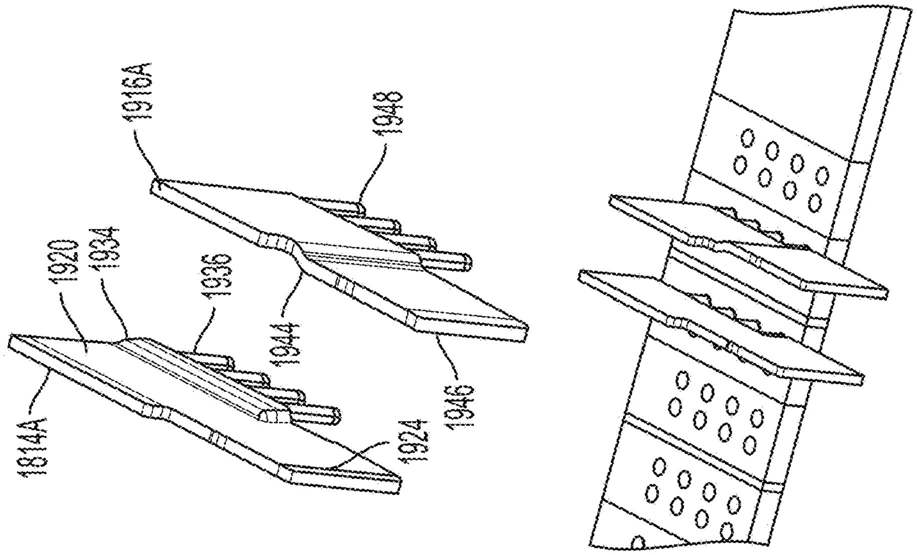
FIG. 19B is a front perspective view of the connector and printed circuit board of FIG. 19A with a terminal of the first pair and a terminal of the second pair shown exploded relative to the printed circuit board.
Figure 19A:
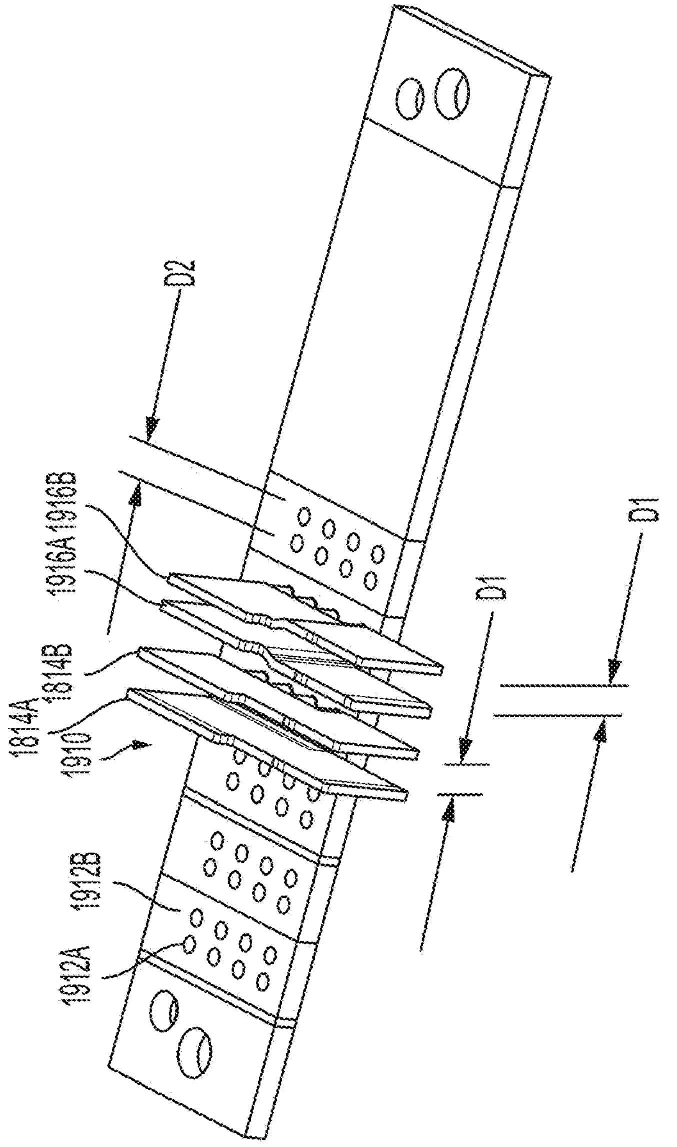
FIG. 19A is a front perspective view of the connector of FIG. 17A with portions cut away to reveal a first pair of terminals at the cable tap off interface and a second pair of terminals, outside the cable tap off interface mounted to a printed circuit board.

FIGS. 19A and 19B show both the mounting footprint 1910 of connector 1700 and the mating portions of terminals in connector 1700. As shown in FIGS. 19A and 19B, pairs of terminals within cable tap off segment 1740 have a different configuration than those in board mount connector portion 1710 outside cable tap off segment 1740. FIG. 19A, for example, shows terminals 1916A and 1916B, for example, with a different shape than 1814A and 1814B. Nonetheless, the terminals may be configured to provide uniformity at the mating and mounting interfaces of connector 1700.

In the example illustrated, each mating region, such as mating regions 1732, 1742 or 1752 holds a pair of terminals. A pair of terminals, such as 1814A and 1814B, is positioned within each mating region 1742 and a pair of terminals, such as 1916A and 1916B, may be positioned within each mating region 1732. Despite differences in the shapes of these terminals, each pair may have mating surfaces, such as mating surfaces 1924 or 1946. Within pairs of each type, the mating surfaces may be separated by a distance D1. Such a configuration enables a connector with a single type of terminals to mate with conventional terminals, such as 1916A and 1916B or tap off terminals such as 1814A and 1814B.

Additionally, tap off terminals such as 1814A and 1814B may have mating surfaces 1920 configured to mate with terminals from a cable connector such as 1764. These mating surfaces within a pair may also be separated by the same distance D1 at the mating surfaces 1920 at the mating interface.

All of the terminals may have the same mounting configuration. In this example, pairs of terminals in the configurations of both pair 1814A and 1814B and terminals 1916A and 1916B have mounting portions configured as posts, such as posts 1936 or 1948 configured to fit within rows of holes, such as 1912A or 1912B. The rows of holes for a pair may be separated by a distance D2.

In the illustrated example, pairs of terminals 1912A or 1912B include posts 1948 extending from body portions of the terminals. The posts 1948 may be in the same plane as the body portion of the terminals. In a conventional connector, to provide pairs of terminals with a spacing of D2 between rows of holes and a spacing of D1 between mating surfaces of the terminals, each of the terminals may include a bend 1944 providing a transition in spacing between the terminals at the mating interface and the body portion that is co-planar with the posts at the mounting interface. In this example, each of the terminals 1916A and 1916B has a bend 1944 The bends are in the opposite directions for terminals 1916A and 1916B, such that the bend increases the separation between the plates forming terminal in transitioning from a body of the terminal to the mating surfaces 1946.

FIG. 19B illustrates that the pair of terminals 1814A and 1814B includes bends 1934 that position the posts 1936 of the pair in rows separated by the distance D2, while enabling the mating surfaces 1920 to be separated by a distance D1. In this example, the bends 1936 of each terminal of a pair are in opposite directions. The bends bring the posts closer together. The bends position the plane of the posts 1936 parallel to but offset from the plane of mating surfaces 1920 and 1924.

Such a configuration may be appropriate for a connector in which D2 is smaller than D1. If D2 is larger than D1, the bends may be opposite from in the foregoing example.

Figure 20:
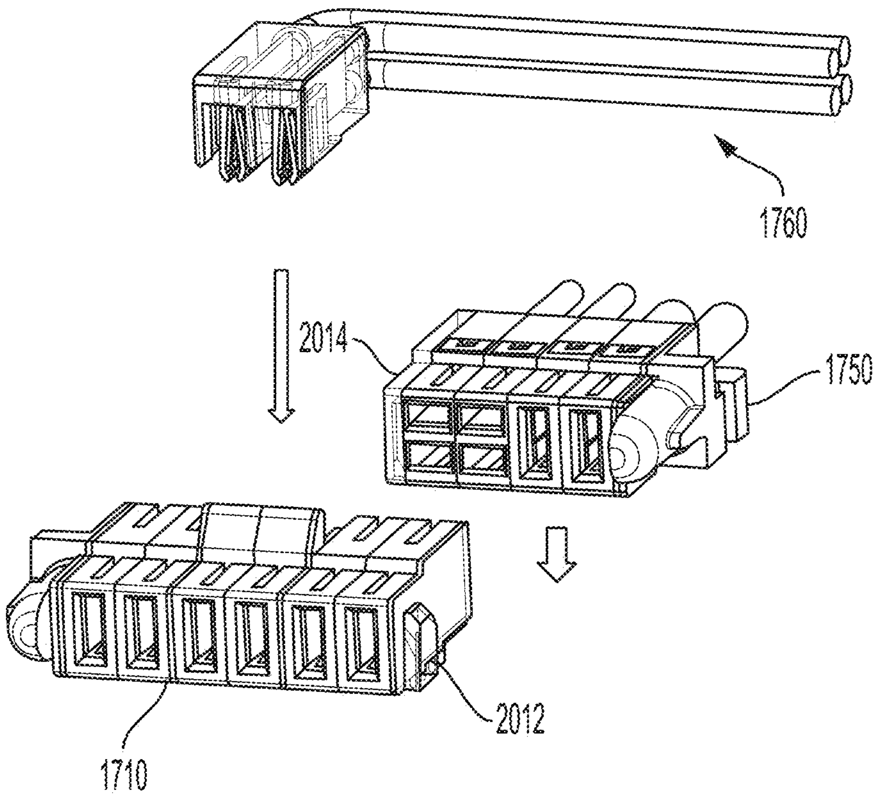
FIG. 20 is a sketch illustrating assembly of an electronic assembly with a connector of FIG. 17A to incorporate tap off and pass-through configurations for high current connections.

FIG. 20 illustrates flexibility of a connector as shown in FIGS. 17-19. As shown in FIG. 17A, board mount connector portion 1710 and pass-through segment 1750 are attached to each other. Such an attachment may result from integrally forming the housings of both segments, such as via an injection molding operation using plastic, nylon or other insulator. Alternatively, board mount connector portion 1710 and pass-through segment 1750 may be separately manufactured and attached when an electronic device is manufacture or reconfigured after manufacture.

In this example, board mount connector portion 1710 may be first attached to a printed circuit board, such as by soldering or as otherwise described above. A cable assembly 1760 may subsequently be mated to the tap off interface on board mount connector portion 1710. A pass-through segment 1750 may be subsequently attached to board mount connector portion 1710. Board mount connector portion 1710, for example, may include a dovetail 2012 extending perpendicular to the mounting interface. Pass-through segment 1750 may include on a side 2014 (not visible in FIG. 20) a complimentary groove to receive dovetail 2012. Accordingly, downward motion, towards a PCB to which board mount connector portion 1710, may be used to attach pass-through segment 1750 to board mount connector portion 1710. By incorporating various combinations of these components into a high-performance electronic system, the system may be easily configured, or reconfigured after manufacture, to support a large variety of power distribution configurations.

Having thus described several embodiments, it is to be appreciated various alterations, modifications, and improvements may readily occur to those skilled in the art. Such alterations, modifications, and improvements are intended to be within the spirit and scope of the invention. Accordingly, the foregoing description and drawings are by way of example only.

Various changes may be made to the illustrative structures shown and described herein.

For example, construction techniques for forming connectors with power tap offs as described herein may be combined in embodiments not expressly illustrated. For example, the location of blade and beam-type mating contact portions may be reversed. As another example, connectors formed with conductive element subassemblies, such as those shown in FIGS. 1A and 11B, may alternatively or additionally have conductive elements stamped from a sheet of metal using the techniques described above in connection with FIG. 14C. Likewise connectors with mating interfaces to mate with card edges may alternatively be formed with mating interfaces to mate with mating connectors, and vice versa. Similarly, any of the configurations for which a bus bar is used as a conductive interconnect for a power tap off may alternatively or additionally be formed using a cable assembly as the conductive interconnect.

As another example of a possible variation, embodiments of an electronic system were described in which a printed circuit board 300 was designed to mate with a power supply unit through connector 310. In such a configuration, electrical power may be sourced from the power supply unit and used by components on printed circuit board 300. However, it should be appreciated that the techniques described herein are applicable to systems in which power flows in either direction through connector 310, and the techniques are useful with systems to couple power in any direction.

As another example of a variation, the power portion 471 of a PCB may comprise a blade of conductive material. For example, the power portion 471 may comprise any of the following: a solid piece of elemental metal having high conductivity (e.g., Cu, Al); a solid piece of an alloy of metals (e.g., a Cu alloy); or a solid plate or core clad with a high-conductivity metal (e.g., a Cu plate clad with Au, a steel plate clad with Cu, a resin plate clad with Cu); or a laminate with layers of high conductivity material interspersed with lower conductivity materials.

Alternative construction techniques for bus bars may also be used. The busbar may be, for example: a solid piece of copper; a core that is clad with a thick layer of copper; a core that is clad with a thick layer of copper and a surface layer of gold; a core that is clad with a thick layer of copper, a layer of silver, and a surface layer of gold; a laminated structure with a thin insulative layer separating two thicker conductive layers; etc. As will be appreciated, the high-conductivity material may be a metal alloy. The core may be made of any material having properties that enable it to be formed into a blade-like shape and that may be clad with another material without adversely reacting with the other (cladding) material. For example, the core may be made of aluminum.

Moreover, a busbar with two portions supporting two electrically separate paths was illustrated to provide an exemplary busbar. Such a busbar may be used, for example, in an electronic device with one high current power circuit. Some electronic devices may have more than one high current power circuit, and may therefore have a busbar with more than two portions, such as 4, 6 or more portions. Each portion of the bus bar may have a mating portion, such as an exposed surface that may be inserted into a card edge connector as pictured above.

Manufacturing techniques may also be varied. For example, embodiments are described in which power conductive elements are formed into terminal subassemblies, which are then inserted into a connector housing. In some embodiments, power conductive elements may be separately inserted into a connector housing.

Connector manufacturing techniques were described using specific connector configurations as examples. A parallel board, right angle connector, that mates with a card edge was described as an example of a first connector. A second connector was illustrated as a vertical card edge connector. Either or both of these connectors may have other forms, including, for example, backplane connectors, cable connectors, stacking connectors, mezzanine connectors, I/O connectors, chip sockets, etc.

In some embodiments, contact tails were illustrated as posts suitable for a pin in holder solder attachment. However, other configurations may also be used, such as surface mount elements, press fits, etc., as aspects of the present disclosure are not limited to the use of any particular mechanism for attaching connectors to printed circuit boards.

Various aspects of the present disclosure may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

The embodiments described herein may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Further, some actions are described as taken by a "user." It should be appreciated that a "user" need not be a single individual, and that in some embodiments, actions attributable to a "user" may be performed by a team of individuals and/or an individual in combination with computer-assisted tools or other mechanisms.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art.

Accordingly, the foregoing description and drawings are by way of example only Terms such as "horizontal" and "vertical" were used to distinguish interfaces of an L-shaped connector. Horizontal and vertical directions may be determined relative to a surface of a printed circuit board to which the connector is mounted or, when the connector is not mounted to the board, the plane that a printed circuit board would occupy. However, such terms indicate relative direction and the horizontal and/or vertical directions may be determined relative to other reference planes.

The present disclosure is not limited to the details of construction or the arrangements of components set forth in the foregoing description and/or the drawings. Various embodiments are provided solely for purposes of illustration, and the concepts described herein are capable of being practiced or carried out in other ways. Also, the phraseology and terminology used herein are for the purpose of description and should not be regarded as limiting. The use of "including," "comprising," "having," "containing," or "involving," and variations thereof herein, is meant to encompass the items listed thereafter (or equivalents thereof) and/or as additional items.

What is claimed is:

1. A conductive element subassembly for an electrical connector, the conductive element subassembly comprising:
- a first member having a first mating contact portion;
- a second member, wherein the second member is separate from and electrically coupled to the first member; and
- a third member separate from and electrically coupled to the second member, the third member having a second mating contact portion and a first portion with a tail integrally formed with the second mating contact portion;

wherein:
- the second member is shaped such that the first mating contact portion is angularly offset relative to the second mating contact portion, and
- the first portion of the third member extends through the second member such that the tail is exposed to form a mounting interface.

2. The conductive element subassembly of claim 1, wherein the second member is L-shaped.

3. The conductive element subassembly of claim 1, wherein the first mating contact portion is angularly offset relative to the second mating contact portion by approximately 90 degrees.

4. The conductive element subassembly of claim 1, wherein the second member is thicker than the first member.

5. The conductive element subassembly of claim 1, wherein the second member is thicker than the third member.

6. The conductive element subassembly of claim 1, further comprising an insulative organizer supporting the second member.

7. The conductive element subassembly of claim 6, wherein the organizer is L-shaped.

8. The conductive element subassembly of claim 7, wherein the organizer comprises one or more sidewalls configured to receive the second member between the sidewalls.

9. The conductive element subassembly of claim 8, wherein the conductive element subassembly comprises a plurality of second members nested with the organizer.

10. The conductive element subassembly of claim 9, wherein the plurality of second members each include an indent and the organizer includes a protrusion for each second member such that the indents and the protrusions register the plurality of second members within the organizer.

11. The conductive element subassembly of claim 6, wherein the second member comprises an indent and the organizer includes a protrusion such that the indent and the protrusion engage to register within the second member within the organizer.

12. The conductive element subassembly of claim 6, wherein the organizer comprises a plurality of holes receiving elongated portions of the first and third members, wherein the elongated portion of each third member comprises the first portion of each third member.

13. The conductive element subassembly of claim 12, wherein the second member comprises a second plurality of holes aligned with the plurality of holes of the organizer.

14. An electrical connector comprising a mating interface, a power tap off interface and a mounting interface, the electrical connector comprising:
- a plurality of first members, each of the first members comprising a mating interface portion at the power tap off interface and comprising a connection portion forming the mounting interface; and
- a plurality of second members;

wherein:
- for each of the plurality of first members, the connection portion forming the mounting interface passes through and is electrically connected to a second member of the plurality of second members.

15. The electrical connector of claim 14, wherein:
- the plurality of second members comprise a plurality of holes; and
- for each of the plurality of first members, the connection portion extends into a hole of the plurality of holes.

16. The electrical connector of claim 15, wherein:
- the connected first members and second members comprise a plurality of terminal subassemblies of the electrical connector, and
- each of the plurality of terminal subassemblies comprises a mating interface portion at the mating interface of the electrical connector.

17. The electrical connector of claim 16, wherein:
- the connection portions of the first members comprise press fits.

18. The electrical connector of claim 17, wherein:
- each of the first members comprises an elongated portion comprising a press fit and a contact tail.

19. The electrical connector of claim 18, wherein:
- the elongated portion of each of the plurality of first members extends through a hole of the plurality of holes and through the second member of the plurality of second members such that the elongated portion comprises the connection portion forming the mounting interface.

20. The electrical connector of claim 19, wherein:
- the plurality of second members each comprises a first segment and a second segment, joined at an angle to the first segment,
- a first subset of the plurality of holes is on the first segments of the plurality of second members;
- a second subset of the plurality of holes is on the second segments of the plurality of second members; and
- the plurality of first members are connected to respective second members at the first subset of holes.

* * * * *